United States Patent
Pasternak et al.

(10) Patent No.: US 10,960,385 B2
(45) Date of Patent: Mar. 30, 2021

(54) METHOD FOR THE PRODUCTION OF NEW NANOMATERIALS

(71) Applicants: COMMISSARIAT A L'ENERGIE ATOMIQUE ET AUX ENERGIES ALTERNATIVES, Paris (FR); UNIVERSITE DE CERGY PONTOISE, Cergy Pontoise (FR)

(72) Inventors: Nicolas Pasternak, Themericourt (FR); Nancy Linder, Neuville Sur Oise (FR)

(73) Assignees: COMMISSARIAT A L'ENERGIE ATOMIQUE ET AUX ENERGIES ALTERNATIVES, Paris (FR); UNIVERSITE DE CERGY PONTOISE, Cergy Pontoise (FR)

(*) Notice: Subject to any disclaimer, the term of this patent is extended or adjusted under 35 U.S.C. 154(b) by 197 days.

(21) Appl. No.: 16/066,025

(22) PCT Filed: Dec. 22, 2016

(86) PCT No.: PCT/FR2016/053641
§ 371 (c)(1),
(2) Date: Jun. 25, 2018

(87) PCT Pub. No.: WO2017/109426
PCT Pub. Date: Jun. 29, 2017

(65) Prior Publication Data
US 2019/0001308 A1    Jan. 3, 2019

(30) Foreign Application Priority Data
Dec. 23, 2015  (FR) ...................... 1563227

(51) Int. Cl.
*B01J 23/755* (2006.01)
*B01J 21/06* (2006.01)
(Continued)

(52) U.S. Cl.
CPC ........... *B01J 23/755* (2013.01); *B01J 21/063* (2013.01); *B01J 21/066* (2013.01); *B01J 23/06* (2013.01);
(Continued)

(58) Field of Classification Search
CPC ........ B01J 23/755; B01J 37/04; B01J 35/004; B01J 21/066; B01J 37/031; B01J 35/002;
(Continued)

(56) References Cited

U.S. PATENT DOCUMENTS

| | | | |
|---|---|---|---|
| 2012/0152336 A1* | 6/2012 | Cao | B82Y 30/00 136/254 |
| 2013/0281283 A1* | 10/2013 | Hashimoto | B01J 37/04 502/5 |
| 2015/0001157 A1* | 1/2015 | Johnson | C02F 1/42 210/688 |

OTHER PUBLICATIONS

Hanaor, Dah; Sorell, DC Review of the anatase to rutile phase of transformation. . Mater Sci, 2011, 46, 855-874.
(Continued)

*Primary Examiner* — Cameron J Allen
(74) *Attorney, Agent, or Firm* — Nixon & Vanderhye

(57) ABSTRACT

A method for producing new nanomaterials, 80 to 100 mol % of which are composed of $TiO_2$ and 0 to 20 mol % are composed of another metal or semi-metal oxide that has a specific surface of 100 to 300 $m^2 \cdot g^{-1}$ and 1 to 3 hydroxyl groups per $nm^2$.

11 Claims, 16 Drawing Sheets

Figure 1:
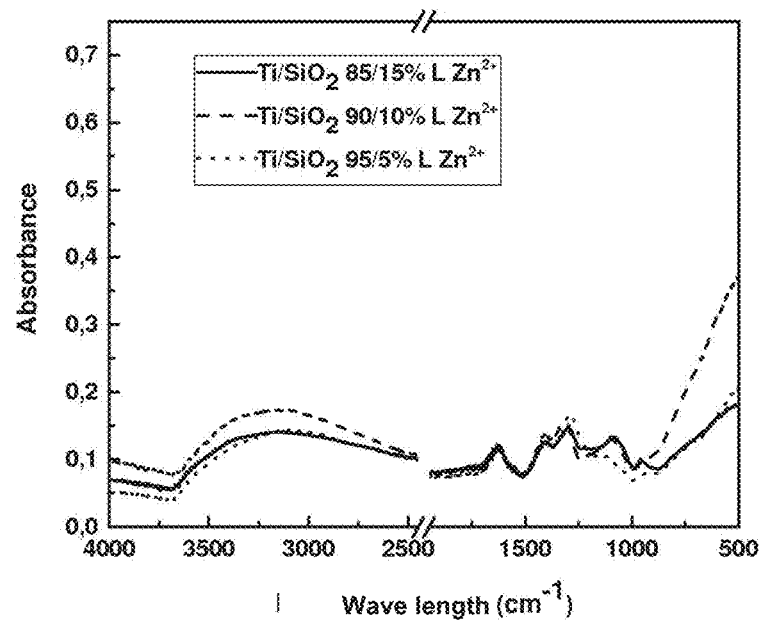

(51) Int. Cl.

| | |
|---|---|
| B01J 37/03 | (2006.01) |
| B01J 37/06 | (2006.01) |
| B01J 23/06 | (2006.01) |
| B01J 23/72 | (2006.01) |
| B01J 35/00 | (2006.01) |
| B01J 37/00 | (2006.01) |
| C01G 41/02 | (2006.01) |
| C01G 25/02 | (2006.01) |
| C01G 9/02 | (2006.01) |
| C01G 23/053 | (2006.01) |
| C01G 49/06 | (2006.01) |
| C01B 33/187 | (2006.01) |
| C01F 7/36 | (2006.01) |
| B01J 23/75 | (2006.01) |
| B01J 35/10 | (2006.01) |
| B01J 37/04 | (2006.01) |
| C02F 1/32 | (2006.01) |
| C02F 1/72 | (2006.01) |
| C02F 101/30 | (2006.01) |
| C02F 101/32 | (2006.01) |

(52) U.S. Cl.
CPC ............... *B01J 23/72* (2013.01); *B01J 23/75* (2013.01); *B01J 35/002* (2013.01); *B01J 35/004* (2013.01); *B01J 35/0013* (2013.01); *B01J 35/1019* (2013.01); *B01J 37/0018* (2013.01); *B01J 37/031* (2013.01); *B01J 37/04* (2013.01); *B01J 37/06* (2013.01); *C01B 33/187* (2013.01); *C01F 7/36* (2013.01); *C01G 9/02* (2013.01); *C01G 23/053* (2013.01); *C01G 25/02* (2013.01); *C01G 41/02* (2013.01); *C01G 49/06* (2013.01); *C02F 1/32* (2013.01); *C02F 1/725* (2013.01); *C01P 2002/82* (2013.01); *C01P 2002/88* (2013.01); *C01P 2004/04* (2013.01); *C01P 2006/12* (2013.01); *C02F 2101/301* (2013.01); *C02F 2101/308* (2013.01); *C02F 2101/32* (2013.01); *C02F 2305/08* (2013.01); *C02F 2305/10* (2013.01)

(58) Field of Classification Search
CPC .... B01J 35/0013; B01J 35/1019; B01J 23/72; B01J 37/0018; B01J 37/06; B01J 21/063; B01J 23/75; B01J 23/06; C01F 7/36; C02F 1/725; C02F 2101/301; C02F 2101/32; C02F 2305/10; C02F 2101/308; C02F 2305/08; C02F 1/32; C01G 9/02; C01G 23/053; C01G 41/02; C01G 25/02; C01G 49/06; C01P 2004/04; C01P 2002/88; C01P 2006/12; C01P 2002/82; C01B 33/187

See application file for complete search history.

(56) References Cited

OTHER PUBLICATIONS

Ibhadon, O.; Fitzpatrick, P. Heterogeneous Photocatalysis: Recent Advances and Applications. Catalysts, 2013, 3, 189-218.

Luttrell, T.; Halpegamage, S.; Tao, J.; Kramer, A.; Sutter, E.; Batzill M. Why is the anatase has better photocatalyst than rutile?—model studies are $TiO_2$ epitaxial films. Sci Rep. , 2014, 9, 4043.

Pillai, SC; Periyat, P.; George R.; McCormack, DE; Seery, MK; Hayden, H.; Colreavy, J.; Corr, D.; Hinder, S; Synthesis of High-Temperature Stable Anatase $TiO_2$ Photocatalyst. . Phys. Chem. C, 111, 1605 (2007).

Liu, ZF; Tabora, J.; Davis, RJ Relationships between Microstructure and Surface Acidity of Ti-Si Mixed Oxide Catalysts. . Catal. 1994, 149, 117-126.

Mahyar, A.; Behnajady, MA; Modirshahla N. Characterization and photocatalytic activity of $SiO_2$-$TiO_2$ nanoparticles mixed oxide Prepared by sol-gel method. Indian Journal of Chemistry, 2010, 49k, 1593-1600.

Miao, G.; Chen, L.; Qi, Z. Easy Active Synthesis and Photocatalysis of Microporous Mesoporous and $TiO_2$ Nanoparticles. Eur. J. Inorg. Chem. , 2012, 5864-5871.

Messina, PV; Schulz, PC Adsorption of reactive dyes is titania-silica Mesoporous Materials. Journal of Colloid and Interface Science, 2006, 299, 305-320. [9] Enriquez, JMH; Lajas, LAC; Alamilla, RG; San Martin, EA; Alamilla, PG; Handy, EB; Galindo GCG; Serrano, LAG Synthesis of Solid Catalysts based acid is $TiO_2$—$SO_2$ and Pt / $TiO_2$.—Apr. 2 S0 applied in n-hexane isomerization Open Journal of Metal, 2013, 3, 34-44.

Enriquez, J. M. H.; Lajas, L. A. C.; Alamilla, R. G.; San Martin, E. A.; Alamilla, P. G.; Handy, E. B.; Galindo, G. C. G.; Serrano, L. A. G. Synthesis of solid acid catalysts based on $TiO_2$—$SO_4^{2-}$—and Pt/$TiO_2$—$SO_4^{2-}$—applied in n-hexane isomerisation. Open Journal of Metal, 2013, 3, 34-44.

Cabo, M.; Pellicer, E.; Rossinyol, E.; Estrader, M.; Lopez-Ortega, A.; Nogués, J.; Castell, O.; Surinach, S.; Baro, MD Synthesis of compositionally graded nanocast NiO / $NiCo_2O_4$ / $Co_3O_4$ Mesoporous composites with tunable magnetic properties. Journal of Materials Chemistry, 2010, 20, 7021-7028.

H. E. Swanson "Standard X-ray Diffraction Powder Patterns" Natl. Off. Stand. (US) Monogr 25. 1969, 7, 83. Institute for Materials Research National Bureau of Standards.

Janus, M.; Kusiak-Nejman, E.; Morawski, AW Determination of the photocatalytic activity of I102 with high adsorption capacity. Mech Cat reac Kinet, 2011, 103, 279-288.

Wang, N.; Li, J.; Lv, W.; Feng, J.; Yan, W. Synthesis of polyaniline / $TiO_2$ composite with excellent adsorption performance on acid red G. Adv RSC, 2015, 5, 21132-. 21141.

Behnajady, MA; Yavaru, S.; Modirshahla N. Investigation is adsorption capacity of I102-P25 nanoparticles in the removal of a monoazo dye from aqueous solution: a comprehensive isotherm analysis. Chem. Ind. Chem. Eng. Q., 2014, 20, 97-107.

Dehong Chen et al: "Facile Synthesis of Monodisperse Mesoporous Zirconium Titanium Oxide Microspheres with Varying Compositions and High Surface Areas for Heavy Metal Ion Sequestration", Advanced Functional Materials, vol. 22, No. 9, May 9, 2012 (May 9, 2012), DE, pp. 1966-1971, XP055221472, ISSN: 1616-301X, DOI: 10.1002/adfm.201102878.

Doremieux-Morin C et al: "Rigid lattice proton NMR study of the constitutive water of titanium oxides (rutile, anatase, amorphous oxide)", Journal of Colloid and Interface Science, Academic Press, New York, NY, US, vol. 95, No. 2, Oct. 1, 1983 (Oct. 1, 1983), pp. 502-512, XP024187291, ISSN: 0021-9797, [retrieved on Oct. 1, 1983], DOI: 10.1016/0021-9797(83)90210-2.

Guillermo Calleja et al: "Study on the synthesis of high-surface-area mesoporous $TiO_2$ in the presence of nonionic surfactants", Industrial & Engineering Chemistry Research, American Chemical Society, US, vol. 43, May 12, 2004 (May 12, 2004), pp. 2485-2492, XP002590154, ISSN: 0888-5885, [retrieved on Apr. 14, 2004], DOI: 10.1021/IE030646A.

Wang Y et al: "Preparation and photocatalytic activity of mesoporous $TiO_2$ derived from hydrolysis condensation with TX-100 as template", Materials Science and Engineering B, Elsevier Sequoia, Lausanne, CH, vol. 128, No. 1-3, Mar. 15, 2006 (Mar. 15, 2006), pp. 229-233, XP027953847, ISSN: 0921-5107, [retrieved on Mar. 15, 2006].

Xu Z et al: "Size effects of nanocrystalline $TiO_2$ on As(V) and As(III) adsorption and As(III) photooxidation", Journal of Hazardous Materials, Elsevier, Amsterdam, NL, vol. 168, No. 2-3, Sep. 15, 2009 (Sep. 15, 2009), pp. 747-752, XP026219163, ISSN: 0304-3894, [retrieved on Feb. 25, 2009], DOI: 10.1016/J. JHAZMAT. 2009.02.084.

(56) References Cited

OTHER PUBLICATIONS

International Search Report, dated Apr. 11, 2017, from corresponding PCT/FR2016/053641 application.

* cited by examiner

METHOD FOR THE PRODUCTION OF NEW NANOMATERIALS

The invention relates to a method of preparation of a nanomaterial, the nanomaterial thus obtained and its use, particularly in photocatalysis.

Increasing interest is being shown in nanocrystalline materials due to their particular properties. Titanium oxides are excellent catalysts particular for degradation of organic contaminants and are very widely used at the present time.

Titanium oxides have three crystalline structures with different properties, namely: Anatase, Rutile, and Brookite. The only one of the three configurations that is stable is rutile [1], with anatase being metastable [1]. Due to the difficulty in its synthesis, brookite is very rarely encountered in photocatalysis [2].

In general, anatase has a higher photocatalytic activity than rutile. Although it has a slightly lower capacity for absorbing solar light, anatase has a larger specific surface area (or adsorption surface area), a larger number of hydroxyl groups at the surface and a lower charge recombination ratio [3].

When no additive (salt, strong acid, etc.) is added, the anatase structure is generally obtained by calcinating materials obtained for several hours at high temperature (>700° C.) [4]. Anatase is fairly reactive in photocatalysis with UV light. On the other hand, its photocatalytic performances are much lower with visible light. Many efforts have been made to improve the performance of anatase with visible light, for example by grafting metal nanoparticles.

Several studies [5] [6] have described the synthesis of Ti/SiO$_2$ hybrid material in a strongly organic medium followed by a heat treatment at high temperature. The materials obtained demonstrate a considerably increased photocatalytic activity, since the available specific area, the adsorbed water quantity and the number of hydroxyl groups in it would be increased. However, the use of organic solvents and the energy expenditure necessary for the heat treatment form ecologically non-negligible disadvantages.

Therefore there is still need for stable new nanomaterials with good photocatalytic performances with natural light and with UV light.

Thus, one purpose of the invention is to disclose such a nanomaterial.

Another purpose of the invention is to obtain a method of preparation of such a nanomaterial.

It is to the merit of the inventors that after considerable research and completely unexpectedly, they discovered that titanium oxides and hybrid oxides can be prepared with a large specific surface area and an increased number of hydroxyl groups without the need to use organic solvents.

Therefore one purpose of the invention relates to a method of preparing a nanomaterial containing 80 to 100 mole % of TiO$_2$ and 0 to 20 mole % of another metal or semi-metal oxide chosen particularly from among SiO$_2$, ZrO$_2$, WO$_3$, ZnO, Al$_2$O$_3$ and Fe$_2$O$_3$, for example from among SiO$_2$ and ZrO$_2$, with a specific surface area of between 100 and 300 m$^2 \cdot$g$^{-1}$ and from 1 to 3 hydroxyl groups per nm$^2$, said method including the following steps:

a) Synthesis of a material composed of 80 to 100 mole % of TiO$_2$ and 0 to 20 mole % of another oxide starting from a titanium oxide precursor or a mix of a titanium oxide precursor and a precursor of the other oxide, the synthesis being made in an aqueous medium with a pH between 0 and 1 and at a temperature varying from 40 to 95° C. in the presence of a non-ionic surfactant chosen from among ankenyl ethers of polyoxyethylene glycol and poloxamers;

b) Elimination of the surfactant from the material synthesised in the previous step by the following steps:

b1) Preparation of a metallised material by washing the material containing the surfactant with an aqueous solution of a bivalent metal salt and an aqueous solution of ammonia, b2) Recovery of firstly the metallised material and secondly a washing solution, b3) Treatment of the metallised material with an inorganic acid to remove the metal from the material, Recovery of firstly a nanomaterial with no surfactant and secondly a residual solution.

The use of a non-ionic surfactant chosen from among ankenyl ethers of polyoxyethylene glycol and poloxamers makes it possible to perform the synthesis of the material in a highly acid aqueous medium without the addition of ethanol. In general, the synthesis of titanium oxide is done without the assistance of a surfactant but in an organic medium, particularly in ethanol [7, 8]. The addition of ethanol slows the reactivity of the titanium oxide precursor that is hydrolysed immediately, thus producing amorphous titanium oxide. Quite surprisingly, the addition of a non-ionic surfactant chosen from among ankenyl ethers of polyoxyethylene glycol and poloxamers in the acid aqueous reaction medium makes it possible to synthesise a nanomaterial without the need to use ethanol or another organic solvent. Without wishing to be bound by any particular theory, the inventors think that the precipitate resulting from the spontaneous hydrolysis of the titanium oxide precursor disappears due to the acid conditions before reappearing with the interaction between the Ti—O—Ti network and the surfactant. The reaction can be optimised by vigorously stirring the reaction medium after spontaneous hydrolysis of the precursor(s).

An ankenyl ether of polyoxyethylene glycol according to the invention is advantageously an ether of polyoxyethylene glycol and oleyl, preferably a polyoxyethylene (10) oleyl ether satisfying the formula $C_{18}H_{35}(EO)_{10}OH$, for example marketed by BASF under the trade name Brij 97.

Examples of poloxamers generally satisfy the formula $(EO)_{5-106}(PO)_{33-70}(EO)_{5-106}$, in which EO is an oxyethylene repetition unit with formula $CH_2CH_2O$ and PO is an oxypropylene repetition unit with formula $CH(CH_3)CH_2O$.

A poloxamer according to the invention is advantageously chosen from among $(EO)_5(PO)_{70}(EO)_5$ (marketed for example by BASF under the trade name Pluronic L121), $(EO)_{13}(PO)_{30}(EO)_{13}$ (marketed for example by BASF under the trade name Pluronic L64), $(EO)_{20}(PO)_{30}(EO)_{20}$ (marketed for example by BASF under the trade name Pluronic P65), $(EO)_{26}(PO)_{39}(EO)_{26}$ (marketed for example by BASF under the trade name Pluronic P85), $(EO)_{17}(PO)_{56}(EO)_{17}$ (marketed for example by BASF under the trade name Pluronic P103), $(EO)_{20}(PO)_{70}(EO)_{20}$ (marketed for example by BASF under the trade name Pluronic P123), $(EO)_{80}(PO)_{30}(EO)_{80}$ (marketed for example by BASF under the trade name Pluronic F68) $(EO)_{106}(PO)_{70}(EO)_{106}$ (marketed for example by BASF under the trade name Pluronic F127), and $(EO)_{100}(PO)_{39}(EO)_{100}$ (marketed for example by BASF under the trade name Pluronic F88), $(EO)_{19}(PO)_{33}(EO)_{19}$ (marketed for example by BASF under the trade name Pluronic 25R4).

Advantageously, the poloxamer satisfies the formula $(EO)_{20}$-$(PO)_{70}$-$(EO)_{20}$, marketed for example by BASF under the trade name Pluronic P123.

For example, the titanium oxide precursor can be chosen from among titanium alkoxides. Preferably, the titanium oxide precursor is chosen from among titanium isopropoxide (TiPOT), titanium ethoxide, titanium n-propoxide and/or titanium butoxide. Among these precursors, titanium isopropoxide (TiPOT) is particularly preferred. The precursor is very reactive in an aqueous medium and enables the spontaneous formation of a precipitation.

For the other oxide, any metal or semi-metal oxide that can improve the properties of the nanomaterial based on $TiO_2$ can be used. In particular, an expert in the subject could use a metal or semi-metal oxide chosen from among $SiO_2$, $ZrO_2$, $WO_3$, ZnO, $Al_2O_3$ and $Fe_2O_3$, particularly from among $SiO_2$, $ZrO_2$, $WO_3$, ZnO and $Al_2O_3$, for example from among $SiO_2$ and $ZrO_2$.

The precursor of the other oxide can be chosen particularly from along silicon orthosilicates, zirconium alkoxides, sodium tungstate (Na2WO4), zinc isopropoxide ($Zn(IpOH)_2$), and aluminium isopropoxide, preferably from among silicon orthosilicates and zirconium alkoxides.

Silicon orthosilicates can be chosen, for example but non-limitatively, from among tetramethyl orthosilicate (TMOS) and tetraethyl orthosilicate (TEOS). Preferably, tetraethyl orthosilicate (TEOS) will be chosen.

One non-limitative example of a zirconium alkoxide that can be used is zirconium propoxide.

In one embodiment, the material synthesis step a) includes the following steps:

a1) preparing an acid aqueous solution of the non-ionic surfactant, a2) adding the titanium oxide precursor or the mixture of the titanium oxide precursor and the precursor of the other oxide to the acid aqueous solution of the non-ionic surfactant, and a precipitate then forms, a3) vigorously stiring the reaction medium so as to dissolve the precipitate formed in step a2) then polymerising the titanium oxide precursor or the mixture of the titanium oxide precursor and the precursor of the other oxide, a4) placing the reaction mixture from step a3) under static conditions for at least 24 h, for example for 24 to 72 h, preferably between 36 and 48 h, and even more preferably during about 48 h, a5) recovering firstly a material composed of 80 to 100 mole % $TiO_2$ and 0 to 20 mole % of the other oxide, and secondly a residual solution.

Advantageously, step a1) in which the material is synthesised consists of the addition and mixing of a non-ionic surfactant chosen from among alkenyl ethers of polyoxyethylene glycol and poloxamers in an aqueous solution with a pH of 0 to 1 and preferably 0, and at a temperature between 40° C. and 60° C., preferably about 50° C. The result obtained at the end of step a) is thus an aqueous solution containing particularly said surfactant.

The aqueous solution used in step a1) is advantageously composed of the non-ionic surfactant, an aqueous solvent (preferably water) and an acid, preferably chosen from among phosphoric acid, sulphuric acid, hydrochloric acid, acetic acid, oxalic acid and compatible mixes of them, and even more preferably hydrochloric acid. An expert in the subject will be able to determine concentrations of aqueous solvent and acid to obtain a pH of 0 to 1, and preferably 0. The aqueous solution of the surfactant is preferably free from all organic solvents.

After adding surfactant into the aqueous solution, mixing is done to dissolve the surfactant in the aqueous solution. This mixing is typically done while stirring, preferably vigorous stirring.

Furthermore, step a1) is advantageously done at a temperature of between 40° C. and 60° C., preferably between 45° C. and 55° C., and even more preferably at a temperature of about 50° C. so as to achieve the best possible solubilisation of the surfactant.

Step a2) then consists of adding a titanium oxide precursor or a mixture of a titanium oxide precursor and a precursor of the other oxide to the solution obtained in the previous step. Since the titanium oxide precursor is very reactive in an aqueous medium, precipitation takes place spontaneously. If the other oxide is $SiO_2$, it becomes less important as the proportion of its precursor is increased.

This step is advantageously done at a temperature of between 40° C. and 60° C., preferably between 45° C. and 55° C., and even more preferably at a temperature of about 50° C.

Step a3) consists of vigorously stirring the reaction medium so as to dissolve the precipitate formed in the reaction mixture step a2), then to polymerise the titanium oxide precursor or the mixture of the titanium oxide precursor and the precursor of the other oxide. By vigorous stirring, the precipitate dissolves very quickly before the appearance of a new precipitation originating from the polymerisation between the three-dimensional structure derived from hydrolysis and polycondensation of inorganic precursors and the micellar network.

Finally, step a4) consists of putting the reaction medium under static conditions, preferably at a temperature of more than 40° C. Advantageously, placement under static conditions takes place in two phases, a first phase at a temperature of between 40° C. and 60° C., preferably between 45° C. and 55° C., even more preferably at a temperature of about 50° C. for a duration of 12 h to 36 h, and preferably for about 24 h; then a second phase at a temperature between 80° C. and 100° C., and preferably between 85° C. and 95° C., even more preferably at a temperature of about 90° C. for a duration of 12 h to 36 h, and preferably about 24 h. A titanium oxide or a homogeneous hybrid oxide is obtained at the end of step a4).

The material synthesised according to step a) in the method according to the invention includes the surfactant used during the synthesis on its surface. The step to eliminate the surfactant performed afterwards enables fast and efficient elimination of this surfactant.

Advantageously, the surfactant can be eliminated from the material in situ, in other words directly following the synthesis step without an intermediate step. The titanium and hybrid oxides prepared in the synthesis step are obtained in the form of very fine powders, which is a major disadvantage when they have to be separated from the reaction medium because they pass through all filtration systems, even sintered filters with very small pores thus considerably reducing the efficiency of the operation.

In all cases and as described above, the surfactant is advantageously eliminated in three steps:

b1) Preparation of a metallised material by washing the material obtained in step a) including the surfactant with an aqueous solution of bivalent metal salt and an aqueous solution of ammonia, b2) Recovery of firstly the metallised material and secondly a washing solution, and b3) Treatment of the metallised material with an inorganic acid to remove the metal from it.

Step b1) consists of preparing a metallised material by treatment of the material containing the surfactant with an aqueous solution of a bivalent metal salt and an aqueous solution of ammonia.

A "treatment" as understood in step b1) of the method can consist of immersing the material containing a surfactant in an aqueous solution of bivalent metal salt and an aqueous solution of ammonia, preferably while stirring.

Such a treatment is preferably done for between about 5 and 20 minutes, preferably between about 10 and 20 minutes, preferably for a duration of about 10 minutes. After 20 minutes, the ammonia causes deterioration to the surface of the hybrid materials.

Advantageously, the treatment is done at ambient temperature, in other words at a temperature between about 15° C. and 30° C. The temperature used is thus much lower than temperatures used in known calcination type extraction processes.

Metal ions from the aqueous bivalent metal salt solution, typically an aqueous solution of copper (II) nitrate, preferably an aqueous solution of copper (II) nitrate trihydrate, play an essential role in said process. These metal ions react with hydroxyl groups on the surface of the material and that protect the surface, causing detachment of the surfactant from the material, while agglomerating the fine nanocrystals or nanoparticles of titanium oxide or hybrid oxide. This agglomeration of nanocrystals or nanoparticles is thus conducive to retention of the oxide on the filtration system, for example on a frit.

The bivalent metal salt can advantageously be chosen from among salts of copper (II), cobalt (II), nickel (II) and zinc (II). Preferably, the bivalent metal salt is a salt of copper (II) or zinc (II), and most preferably copper (II).

Advantageously, it can be chosen from among inorganic salts, for example such as sulphates or nitrates. It is preferably a nitrate.

The ammonia is used to deprotonate functional groups (hydroxyl groups on the surface). Furthermore, ammonia can deprotonate OH groups of the surfactant that enables complexation of metal ions. The surfactant complexed with the metal ions can easily be separated from the nanomaterial.

An expert in the subject will be capable of adapting the concentration of the aqueous solution of a bivalent metal salt, as a function of the salt, the composition of the nanomaterial and the surfactant used. In particular an aqueous solution of a bivalent metal salt could be used, for example an aqueous solution of copper (II) nitrate, preferably trihydrate, at a concentration of about 0.02 to 0.08 $mol \cdot L^{-1}$, preferably about 0.05 $mol \cdot L^{-1}$ and the aqueous solution of ammonia, particularly with a concentration of 35-37% v/v.

Advantageously, quantities of about 40 to 50 mL of an aqueous solution of a bimetal salt, for example copper (II) nitrate, and about 1.4 to 3 mL of aqueous solution of ammonia can be used for 1 g of material containing the surfactant.

The aqueous solution of ammonia is advantageously added so as to obtain a pH between 10 and 11.5, preferably between 10 and 10.7, more preferably about 10.5. An expert in the subject will be capable of adapting the concentration and/or the quantity of ammonia so as to reach the required pH.

According to one particularly advantageous embodiment of an in situ elimination of the surfactant, the aqueous solution of ammonia and the aqueous solution of a metal salt are directly incorporated into the reaction medium containing the material. This incorporation may be made by adding aqueous solutions of ammonia and the bivalent metal salt to the reaction medium containing the material or preferably by adding the reaction medium containing the material to aqueous solutions of ammonia and the bivalent metal salt. When the aqueous solutions of ammonia and bivalent metal salt are added to the reaction medium containing the material, these solutions can be added one after the other or simultaneously. In one variant of this embodiment, the aqueous solution of the bivalent metal salt is firstly mixed with the aqueous solution of ammonia and the mixture is then added to the reaction medium containing the material. When the incorporation is made by adding the reaction medium into aqueous solutions of ammonia and bivalent metal salt, these solutions are advantageously mixed, particularly by adding the aqueous solution of ammonia into the aqueous solution of bivalent metal salt.

After incorporation of the aqueous solutions of ammonia and bivalent metal salt into the reaction medium, the reaction medium is advantageously stirred so as to increase the metallisation efficiency of the material.

The in situ elimination of the surfactant is particularly advantageous because the nanoparticles or nanocrystals of the nanomaterial are very, very fine thus making separation of the reaction medium extremely difficult and sometimes unworkable.

According to another embodiment, the aqueous solution of the bivalent metal salt is mixed in a first step, with the aqueous solution of ammonia. The material comprising the surfactant previously separated from the reaction medium is immersed in a second step into the mix of the aqueous solution of a bivalent metal salt and the aqueous solution of ammonia.

Step b2) to eliminate the surfactant consists of recovering firstly the metallised material obtained after step a) and secondly a washing solution. Such a step to recover the metallised material can for example be done by separation, by any known means and particularly by filtration of the mixture obtained in step b1). This recovery step, particularly by filtration, can give firstly the metallised material and secondly a washing solution, composed essentially of the surfactant detached from the material, metal ions that did not react with the hydroxyl groups on the surface of the material, and residual ammonia, and when metallisation was done in situ, residues of synthesis of the material. Without wishing to be bound by any particular theory, the inventors think that the different components of the washing solution are in the form of one or more complexes.

For the purposes of this description, "metallised material" means the material modified by step a) in the method according to the invention, particularly by grafting of metal ions, for example copper (II), to the surface of said material.

A step to rinse the metallised material recovered in step b2) can advantageously be done, for example using water.

A drying step of the metallised material (rinsed or not) can advantageously be done. The metallised material can thus be dried at ambient temperature, for example between 15° C. and 30° C., or in a drying oven for example at a temperature of about 40° C. to 60° C., and preferably about 50° C.

Step b3) in said method consists of treating the metallised material obtained in step b2), possibly rinsed and/or dried, with an inorganic acid to remove the metal from the metallised material, in other words the metal ions grafted during step a) in the method.

Therefore, in particular, step b3) in the method according to the invention, removes metal irons previously grafted to the material, and consequently extracts all of the surfactant remaining in the material, chelated to metal ions.

"Inorganic acid" refers to any inorganic acid capable of removing metal previously grafted to the material, advantageously without damaging the surfactant. Preferably, the inorganic acid is a solution of nitric acid ($HNO_3$) or a solution of hydrochloric acid (HCl). Even more preferably, the inorganic acid is a solution of nitric acid ($HNO_3$).

A "treatment" as understood in step b3) of the method can consist of immersing the metallised material in an inorganic acid solution, preferably while stirring.

According to one particular embodiment, a quantity of about 5 ml of nitric acid solution, for example with 60% v/v, can be used for 100 mg of metallised material.

Advantageously, the treatment is done at ambient temperature, in other words at a temperature between about 15° C. and 30° C. The temperature used in this case is thus also much lower than the temperatures used in known calcination type extraction processes.

Preferably, the treatment is performed for a duration of between about 5 and 30 minutes, preferably between about 10 and 25 minutes, preferably for a duration of about 20 minutes.

In one particularly advantageous embodiment, the treatment with inorganic acid is followed by washing with water, preferably in a centrifuge. Advantageously, several successive centrifuging cycles are performed, preferably 2 cycles, drawing off the used aqueous solution after each cycle and replacing it with clean water.

The material is recovered after the treatment with the inorganic acid, in step c). It contains no surfactant. In this description, the term "surfactant-free" means that the surfactant can no longer be detected. The result obtained is thus firstly a surfactant-free material and secondly a residual solution.

A step to rinse the surfactant-free material recovered in step c) can advantageously be done, for example using water to remove acid residues.

A drying step of the material with no metal or surfactant, rinsed or not rinsed, can advantageously be done. The surfactant-free material can thus be dried at ambient temperature, for example between 15° C. and 30° C., or in a drying oven for example at a temperature of about 40° C. to 60° C., and preferably about 50° C.

The material recovered after step c) in the method according to the invention, and possibly rinsed and/or dried, is not only surfactant-free but its surface has not been degraded by the method according to the invention. Furthermore, when the material according to the invention is composed of titanium dioxide, it has a rutile nanocrystalline structure. Without wishing to be bound by any particular theory, the inventors think that the use of a non-ionic surfactant chosen from among alkenyl ethers of polyoxyethylene glycol and poloxamers combined with the elimination of surfactants by washing as described above is essential to obtain a titanium dioxide with a rutile nanocrystalline structure. Scanning electron microscopy analyses of hybrid oxides according to the invention show that these nanomaterials are homogeneous. This homogeneity is a first index showing that the hybrid oxides are probably also crystalline.

Furthermore the combined use of an aqueous solution of ammonia and bivalent metal ions to eliminate the surfactant used during the synthesis can improve the reactivity of the material composed of titanium dioxide or hybrid oxide according to the invention. Interestingly, such a method can increase the specific surface area, the number of hydroxyl (OH) groups and the ability of said material to absorb water. Finally, an increase in the surface acidity of the material has been detected. This acidity appears to originate from the inorganic acid, typically nitric acid, used during step b) in the method according to the invention. It has been demonstrated that acidification of the surface can improve reactivity [9].

Therefore the invention also relates to the material that can be obtained by the method according to the invention in itself. Such a material composed of 80 to 100 mole % of $TiO_2$ and 0 to 20 mole % of another oxide chosen from among $SiO_2$, $ZrO_2$, $WO_3$, $ZnO$, $Al_2O_3$ and $Fe_2O_3$ is characterised particularly in that it has a specific surface area of between 100 and 300 $m^2 \cdot g^{-1}$, particularly between 110 and 260 $m^2 \cdot g^{-1}$, and 1 to 3, particularly 1.1 to 2.5 hydroxyl groups per $nm^2$. The pH of the material is between 3 and 5, and preferably between 3.5 and 4.5. The pH of the materials according to the invention can be determined by bringing an aqueous solution of a coloured pH indicator for example such as bromophenol blue or methyl orange into contact with the material.

In one particular embodiment, the nanomaterial according to the invention is composed of 100% $TiO_2$ and has a rutile nanocrystalline structure. This rutile nanocrystalline material advantageously has a specific surface area of 100 to 200 particularly between 110 and 160 $m^2 \cdot g^{-1}$, and from 0 to 3, particularly 1.5 to 2.5 hydroxyl groups per $nm^2$.

In another embodiment, the nanomaterial according to the invention is a hybrid oxide composed of 80 to 95 mole % of $TiO_2$ and 5 to 20 mole % of another oxide chosen from $SiO_2$, $ZrO_2$, $WO_3$, $ZnO$, $Al_2O_3$ and $Fe_2O_3$, preferably from $SiO_2$ and $ZrO_2$, even more preferably the other oxide is $SiO_2$. This nanomaterial advantageously has a specific surface area of 180 to 300 $m^2 \cdot g^{-1}$, particularly between 190 and 260 $m^2 \cdot g^{-1}$, and from 1 to 2, particularly 1.1 to 1.5 hydroxy groups per $nm^2$.

For comparison, a titanium oxide on which a calcination is made at a temperature higher than 650° C. is in anatase form. A titanium dioxide calcinated at 550° C. (under the conditions described in the examples) has a rutile structure and a specific surface area of 32 $m^2 \cdot g^{-1}$, 0.6 hydroxyl groups per $nm^2$. No colour change is observed when the calcinated titanium dioxide is brought into contact with the aqueous solution of a coloured pH indicator for example such as bromophenol blue or methyl orange, which indicates a neutral pH of about 7.

Typically, the specific surface area of the nanomaterials can be determined by volumetric adsorption of nitrogen, in the same way as in the examples.

The number of hydroxyl groups can be determined by thermogravimetric analysis (TGA), from the loss of mass measured during heating (typically up to 850° C. at a rate of 10° C./min). Reference can also be made to the examples in this application.

Due to their particular physiochemical characteristics, the nanomaterials according to this invention have exceptional photocatalytic capacities. Without wishing to be bound by any particular theory, the inventors think that these exceptional photocatalytic capacities form a crystallinity index of the nanomaterials according to the invention.

The adsorption capacity and the photodegradation capacity of compounds, for example organic compounds, are higher than those of commercial titanium dioxide, particularly PC50 $TiO_2$ marketed by Millenium, or Degussa P25 $TiO_2$ marketed by Degussa, and those of titanium dioxides calcinated at 550° C. The tests carried out by the inventors on dyes with different structures have thus demonstrated that the adsorption performances of dye molecules and the photocatalytic destruction performances are significantly higher with nanomaterials according to the invention than with commercial titanium dioxides and titanium dioxides calcinated at 550° C. Encouraging results have also been obtained on pesticides, hydrocarbons and saccharides.

It is thus possible to trap one or several compounds, particularly organic compounds, for example like one or several organic dyes, through their adsorption to the surface of said nanomaterial and possibly to recover it later. The compound(s) can be recovered for example by drying the nanomaterial and treating it with ethanol to desorb the compound(s), particularly organic, that are then in solution in the ethanol. The adsorbed compound(s) can also be destroyed under radiation, particularly in the visible range, for example by sunlight or halogen or UV light. The time necessary for destruction of the compound(s) will depend on the nature of this (these) compound(s) and will be easy to determine by an expert in the subject.

Thus another purpose of this invention also relates to the use of a nanomaterial according to the invention to trap one or several compounds by adsorption to the surface of the nanomaterial. The compounds are preferably chosen from among organic compounds, preferably among dyes, pharmaceutical active constituents, pesticides, hormones, saccharides such as glucose, and/or hydrocarbons, preferably among dyes, pesticides, fungicides, saccharides such as glucose and hydrocarbons, and even more preferably among dyes.

According to one variant, the compounds are trapped and are subsequently recovered. As mentioned above, to achieve this, the nanomaterial may for example be dried and treated with an appropriate solvent. An expert in the subject will be capable of choosing the solvent as a function of the compound(s) to be desorbed. Thus, for example he will be able to use a polar organic solvent such as an alcohol, for example ethanol to desorb the compound(s), particularly organic compounds, that are then in solution in the solvent.

The invention also relates to a method of trapping one or several compounds, particularly organic, by adsorption onto the surface of a nanomaterial according to the invention by bringing said nanomaterial into contact with a solution containing the compound(s) so as to adsorb them on the surface of the nanomaterial. The nanomaterial that has thus adsorbed the compound(s) can then be separated from the solution initially containing the compound(s) and possibly dried.

According to one variant of this method, the compounds are trapped and are subsequently recovered. This recovery may for example consist of desorbing the compound(s), particularly organic, by treating the nanomaterial that had adsorbed this or these compounds with ethanol and separating the ethanol solution containing the compound(s) from the nanomaterial.

The compounds are preferably chosen from among organic compounds, preferably among dyes, pharmaceutical active constituents, pesticides, hormones, saccharides such as glucose, and/or hydrocarbons, preferably among dyes, pesticides, fungicides, saccharides such as glucose and hydrocarbons, and even more preferably among dyes.

Another purpose of the invention relates to the use of a nanomaterial according to the invention for the photocatalytic degradation of compounds, said compounds preferably being chosen from among organic compounds, preferably among dyes, pharmaceutical active constituents (for example antibiotics, particularly in the penicillins family, such as ampicillin), herbicides, pesticides, fungicides, hormones, saccharides such as glucose, and/or hydrocarbons, preferably among dyes, antibiotics, herbicides, pesticides, fungicides, saccharides such as glucose, and hydrocarbons, even more preferably among dyes, antibiotics, herbicides, saccharides such as glucose, and hydrocarbons, and most preferably dyes.

The invention also relates to a method for catalytic degradation of compounds, particularly organic compounds including bringing a nanomaterial according to the invention into contact with a solution containing the compound(s) to be destroyed and exposure of the assembly to UV radiation and/or visible radiation so as to destroy compounds adsorbed onto the surface of the nanomaterial. The time necessary for destruction of the compound(s) under radiation will depend on the nature of this (these) compound(s) and will be easy to determine by an expert in the subject.

Naturally, other embodiments of the invention could have been envisaged by an expert in the subject without going outside the framework of the invention defined by the claims given below.

Non-limitative examples of embodiments of the invention are described below.

FIGURES

FIG. 1: FTIR spectra obtained from $Ti/SiO_2$ hybrid nanomaterials from which the surfactant has been extracted using the method according to the invention ("L") using zinc (II) nitrate.

Figure 2:
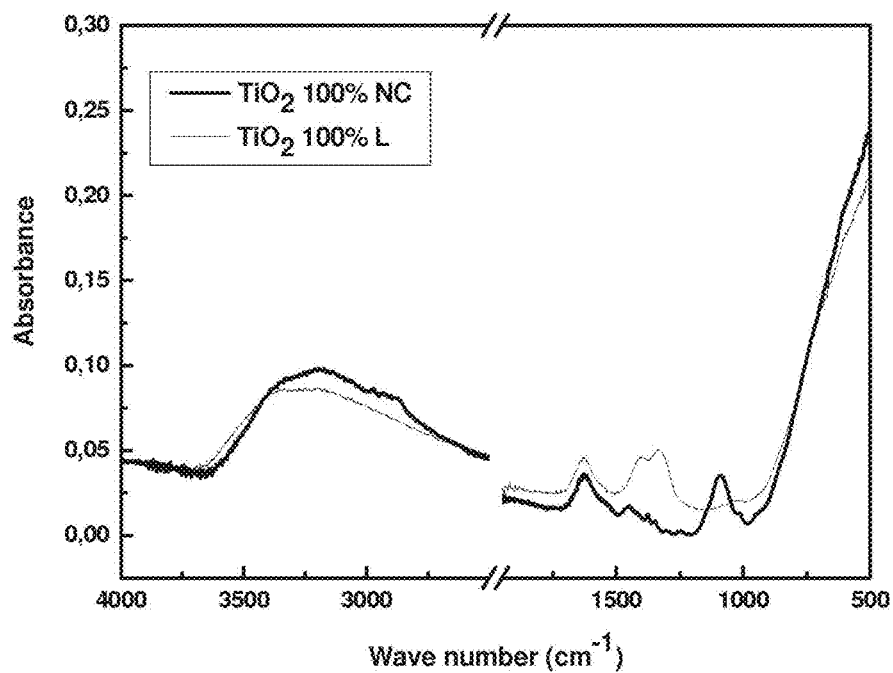

FIG. 2: FTIR spectra obtained from nanomaterials based on titanium oxide elimination of the surfactant ("NC") and from which the surfactant has been extracted using the method according to the invention ("L").

Figure 3:
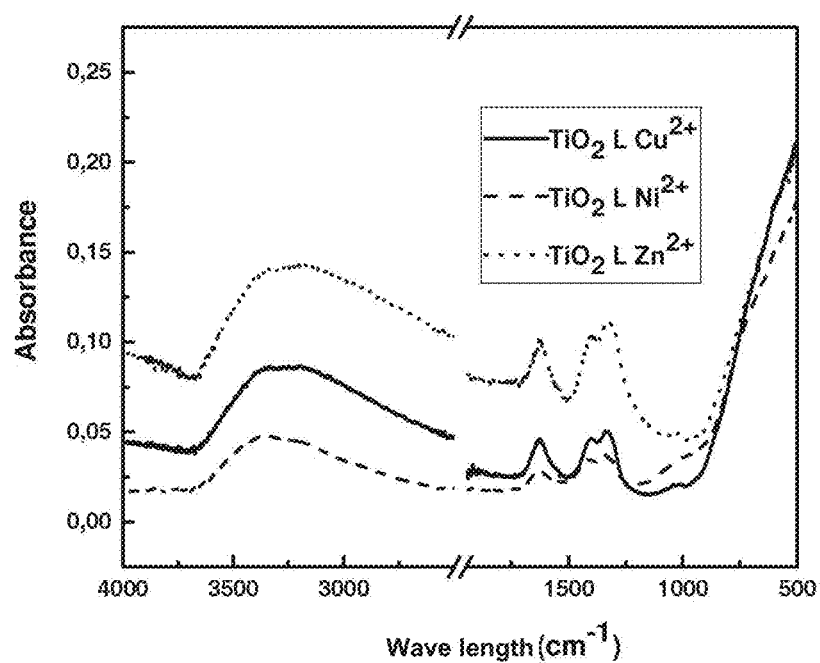

FIG. 3: FTIR spectra obtained from nanomaterials based on titanium oxide and from which the surfactant has been extracted using the method according to the invention ("L") using zinc (II) nitrate, nickel (II) nitrate and copper (II) nitrate, respectively.

Figure 4A:
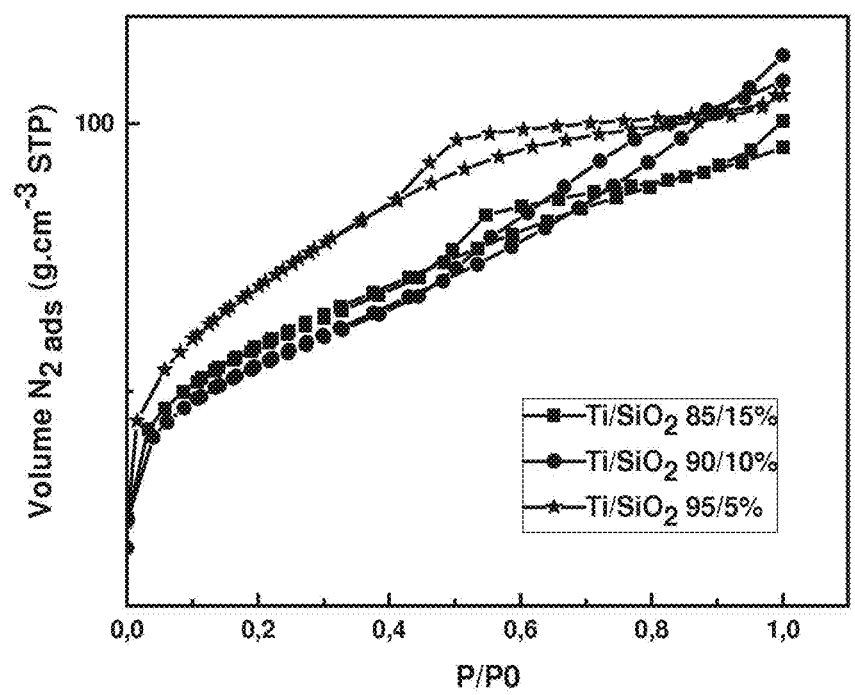

FIG. 4A: Nitrogen volumetric absorption isotherms, representing the adsorbed volume as a function of P/P0 (pressure/saturating vapour pressure), of different $Ti/SiO_2$ hybrid oxides from which the surfactant has been extracted using the method according to the invention (85/15% $Ti/SiO_2$, 90/10% $Ti/SiO_2$, 95/5% $Ti/SiO_2$).

Figure 4B:
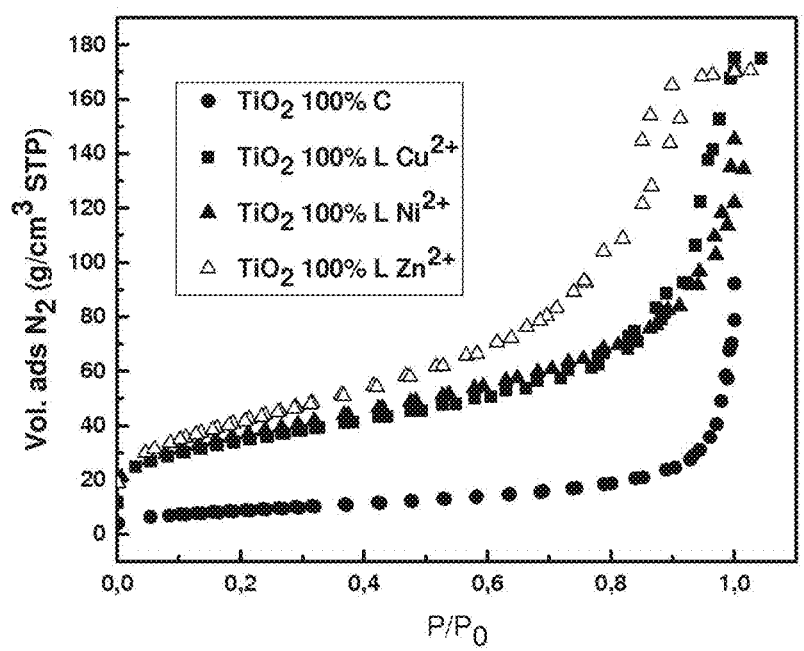

FIG. 4B: Nitrogen volumetric absorption isotherms, representing the adsorbed volume as a function of P/P0 (pressure/saturating vapour pressure), of a titanium dioxide from which the surfactant has been extracted by calcination ($TiO_2$ C), or by the method according to the invention $TiO_2$ L).

Figure 5A:

FIG. 5A: Transmission electron microscopy image of $TiO_2$ L $Zn^{2+}$.

Figure 5B:
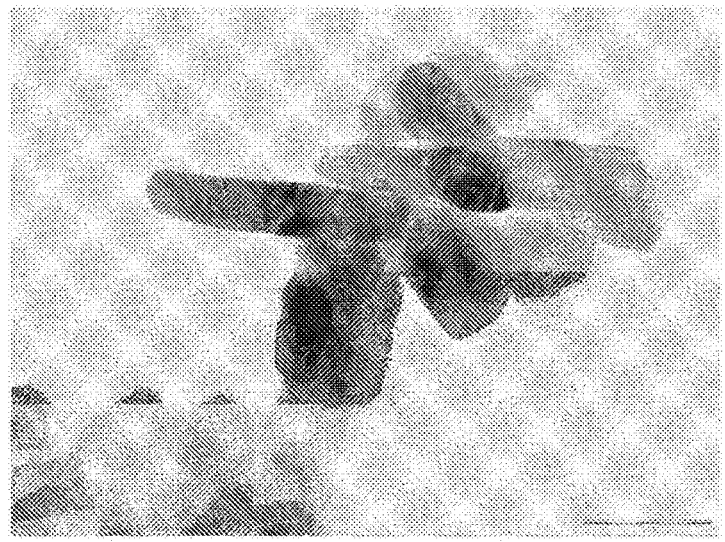

FIG. 5B: Transmission electron microscopy image of $TiO_2$ C.

Figure 6A:
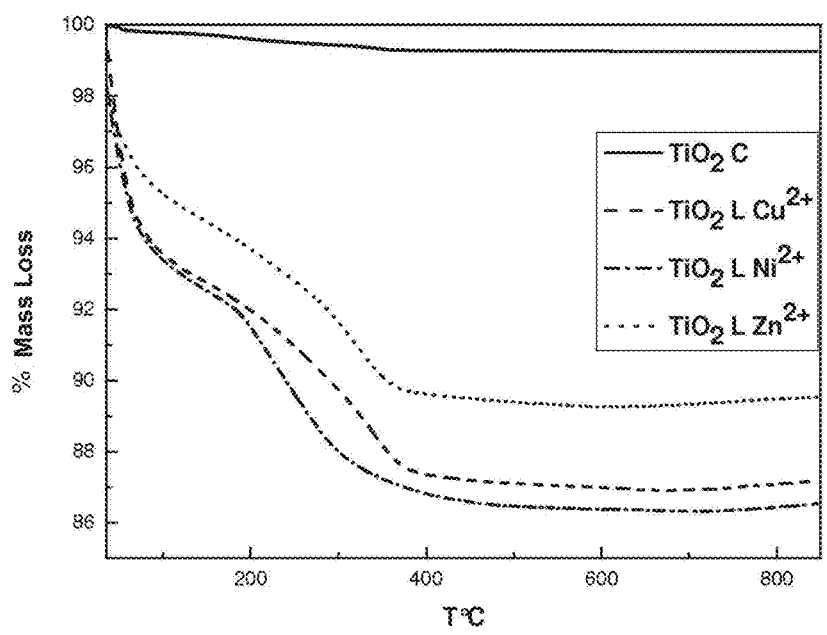

FIG. 6A: Thermogravimetric analysis (TGA) graphs for $TiO_2$ C, $TiO_2$ L $Zn^{2+}$, $TiO_2$ L $Ni^{2+}$, $TiO_2$ L $Cu^{2+}$.

Figure 6B:
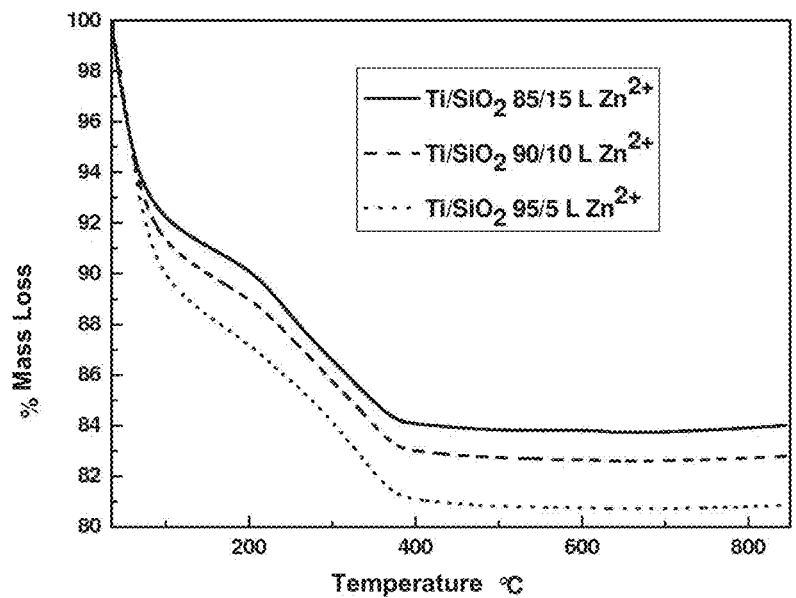

FIG. 6B: Thermogravimetric analysis (TGA) graphs for 85/15% $Ti/SiO_2$, 90/10% $Ti/SiO_2$, 95/5% $Ti/SiO_2$ and $TiO_2$ L $Zn^{2+}$.

Figure 7A:
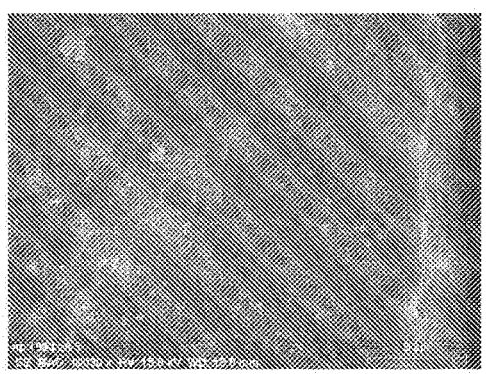

FIG. 7A: Scanning microscopy image for 100% $TiO_2$ L $Zn^{2+}$.

Figure 7B:
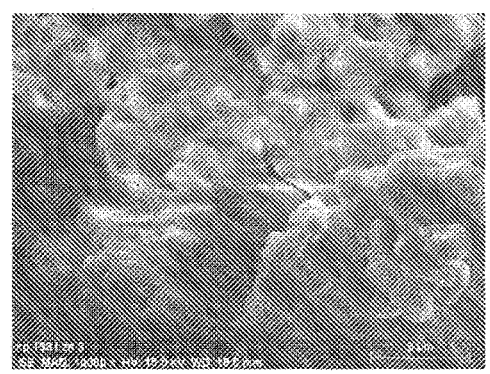

FIG. 7B: Scanning microscopy image graphs for 95/5% $Ti/SiO_2$.

Figure 7C:
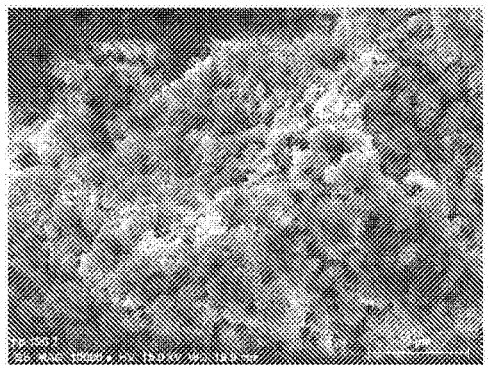

FIG. 7C: Scanning microscopy image graphs for 90/10% $Ti/SiO_2$.

Figure 7D:
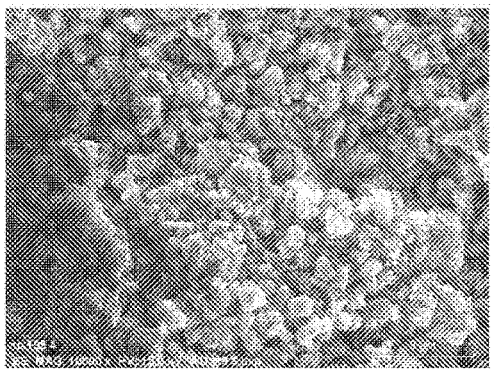

FIG. 7D: Scanning microscopy image graphs for 85/15% $Ti/SiO_2$.

Figure 8:
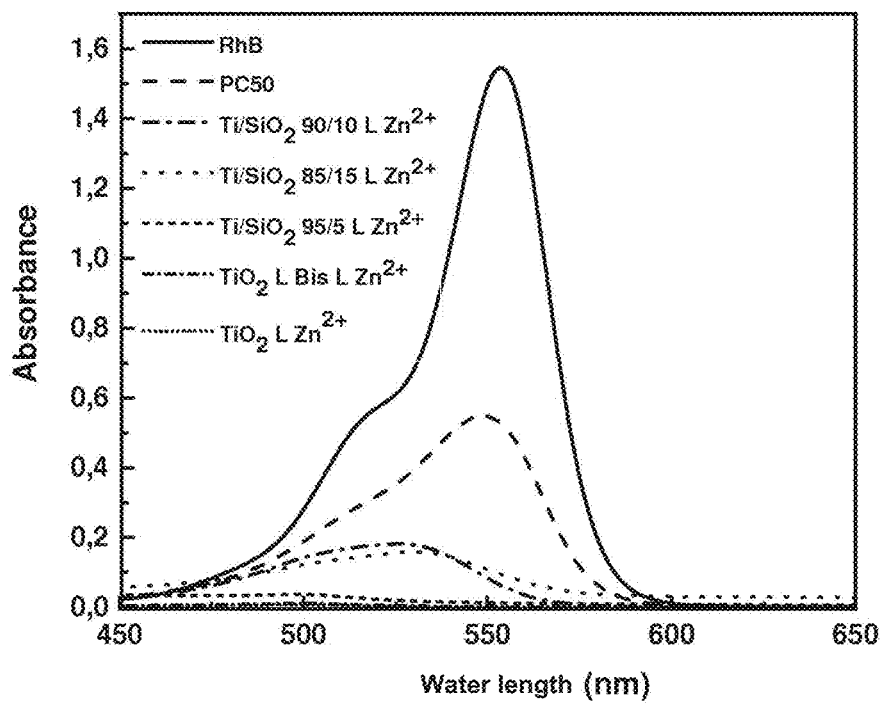

FIG. 8: UV/visible absorption spectra for Rhodamine B and photocatalytic degradation of Rhodamine B under radiation from a visible spotlight (300 W) with different nanomaterials according to the invention and a commercial titanium dioxide (PC50).

Figure 9:
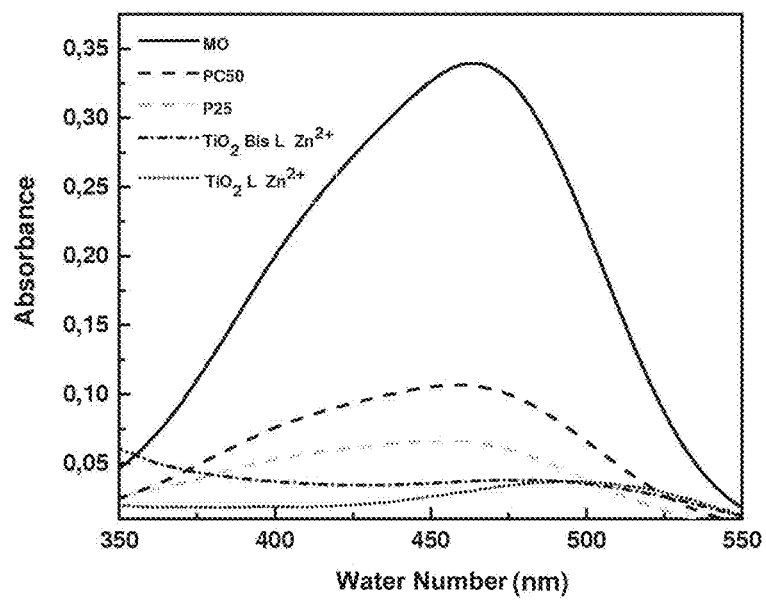

FIG. 9: UV/visible absorption spectra for Rhodamine B and photocatalytic degradation of Rhodamine B under radiation from a UV lamp (12 W) ($\lambda_{max}$=365 nm, 12 W) with different nanomaterials according to the invention and a commercial titanium dioxide (PC50).

Figure 10:
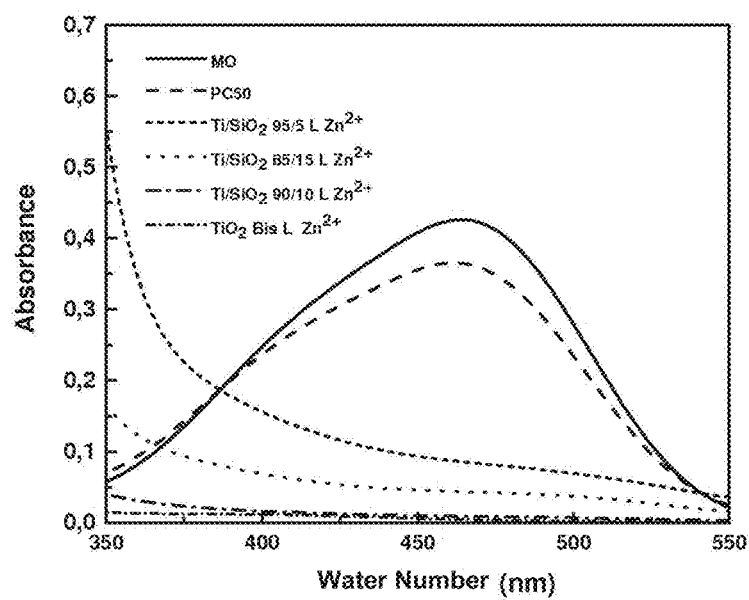

FIG. 10: UV/visible absorption spectra for methyl orange and photocatalytic degradation of methyl orange under radiation from a visible spotlight (300 W) with different nanomaterials according to the invention and a commercial titanium dioxide (PC50).

Figure 11:
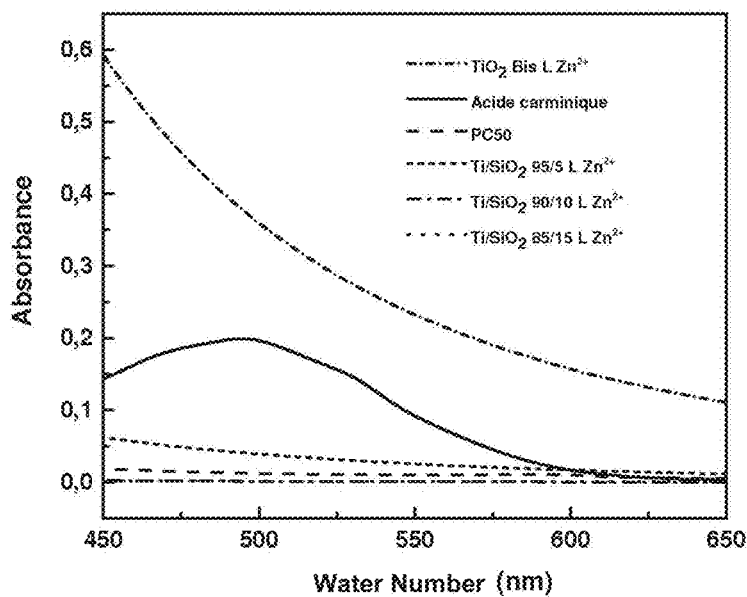

FIG. 11: UV/visible absorption spectra for carminic acid and photocatalytic degradation of carminic acid under radiation from a visible spotlight (300 W) with different nanomaterials according to the invention and a commercial titanium dioxide (PC50).

Figure 12:
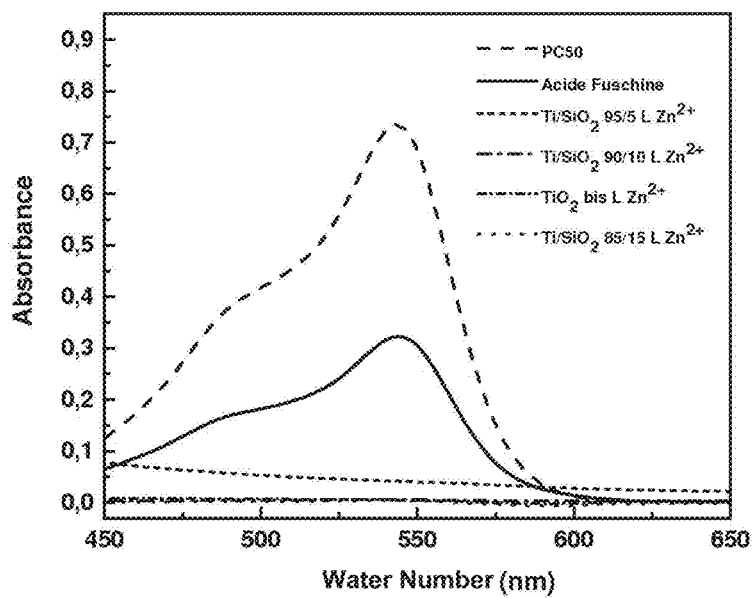

FIG. 12: UV/visible absorption spectra for fuchsin acid and photocatalytic degradation of fuchsin acid under radiation from a visible spotlight (300 W) with different nanomaterials according to the invention and a commercial titanium dioxide (PC50).

Figure 13:
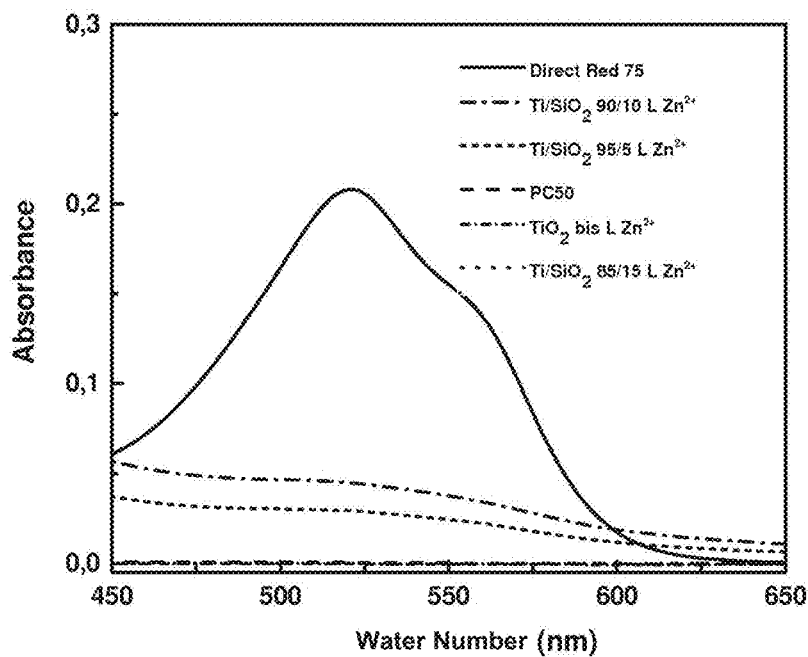

FIG. 13: UV/visible absorption spectra for direct red 75 and photocatalytic degradation of direct red 75 under radiation from a visible spotlight (300 W) with different nanomaterials according to the invention and a commercial titanium dioxide (PC50).

Figure 14:
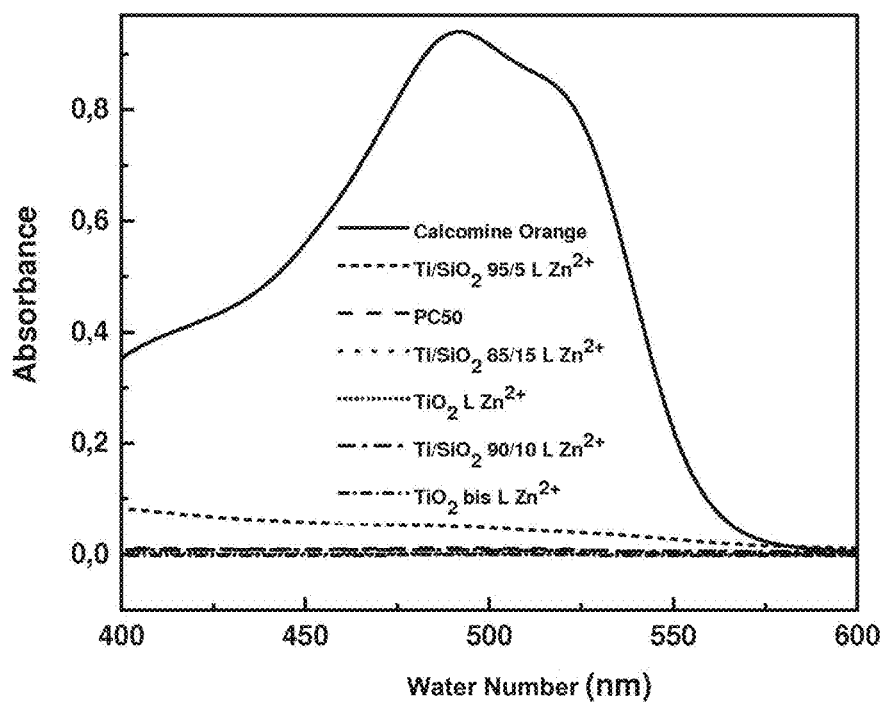

FIG. 14: UV/visible absorption spectra for calcomine orange and photocatalytic degradation of calcomine orange under radiation from a visible spotlight (300 W) with different nanomaterials according to the invention and a commercial titanium dioxide (PC50).

Figure 15:
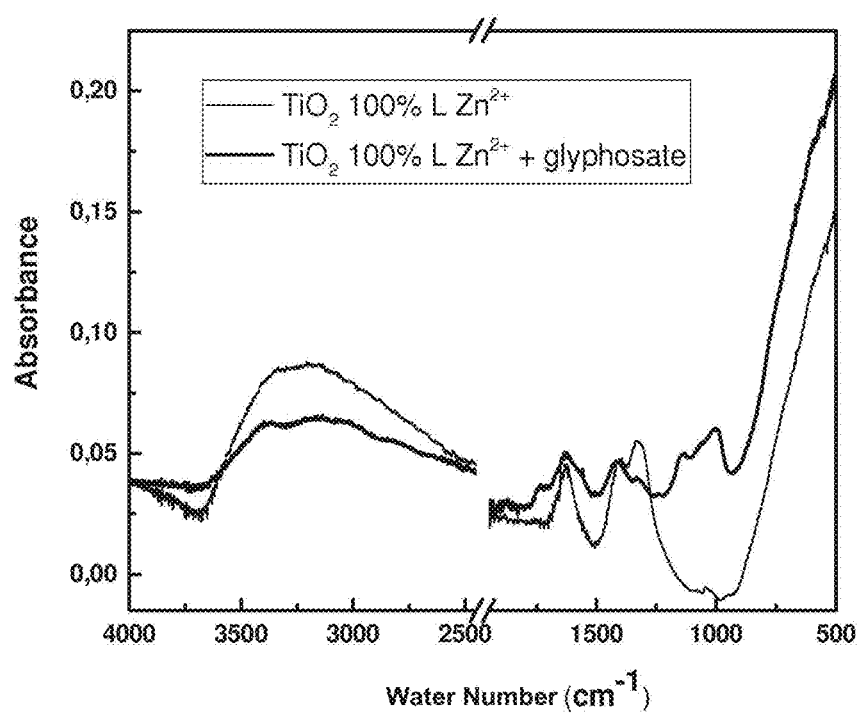

FIG. 15: UV/visible absorption spectra for glyphosphate and photocatalytic degradation of glyphosphate under radiation from a visible halogen spotlight (300 W) with different nanomaterials according to the invention and a commercial titanium dioxide (PC50).

FIG. 16A: HPLC spectrum of ampicillin.

Figure 16:
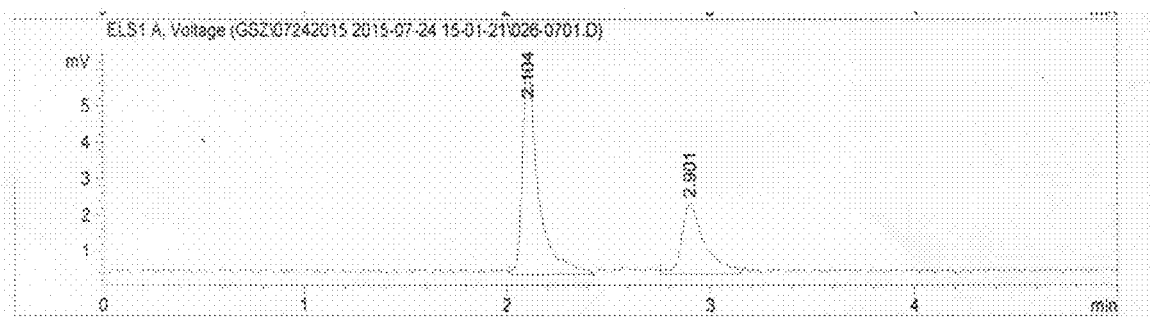
Figure 16B:
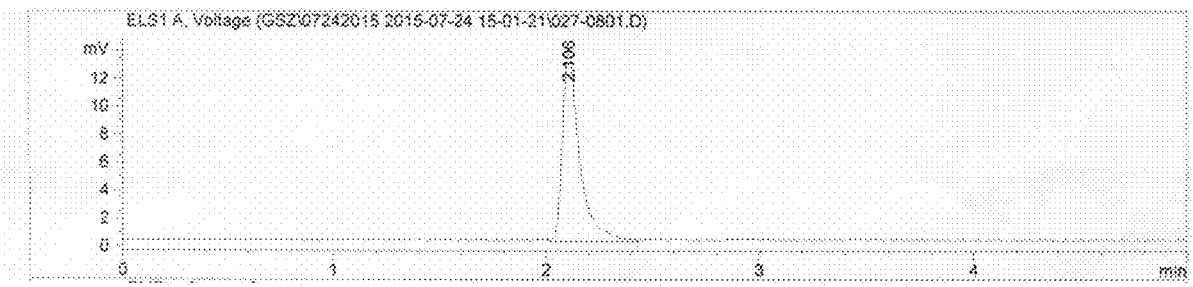

FIG. 16B: HPLC spectrum of the photocatalytic degradation of ampicillin after 5 h under radiation from a visible halogen spotlight (300 W) with $TiO_2$-L $Zn^{2+}$.

Figure 17:
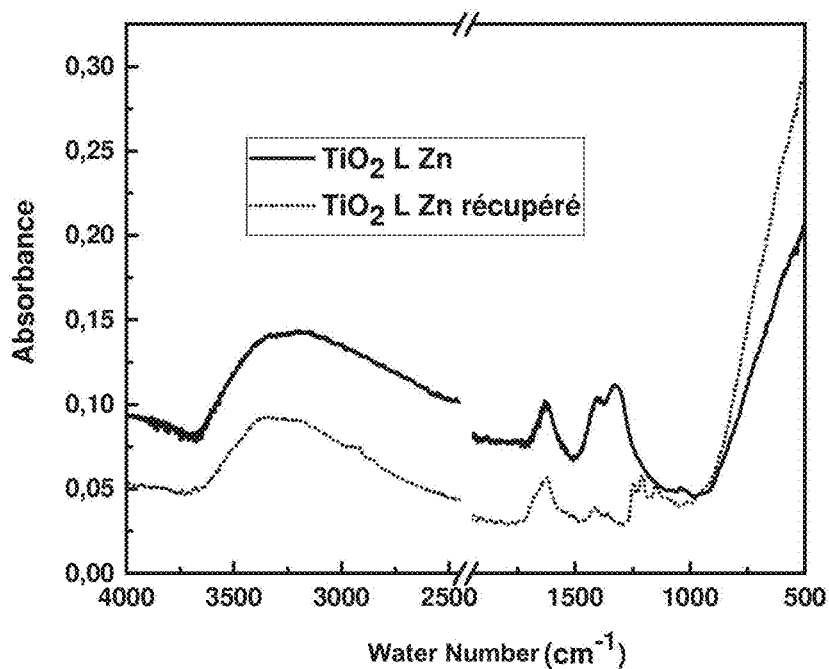

FIG. 17: UV/visible absorption spectra for perfluorooctanoic acid and photocatalytic degradation of perfluorooctanoic acid under radiation from a visible halogen spotlight (300 W) with different nanomaterials according to the invention and a commercial titanium dioxide (PC50).

Figure 18:
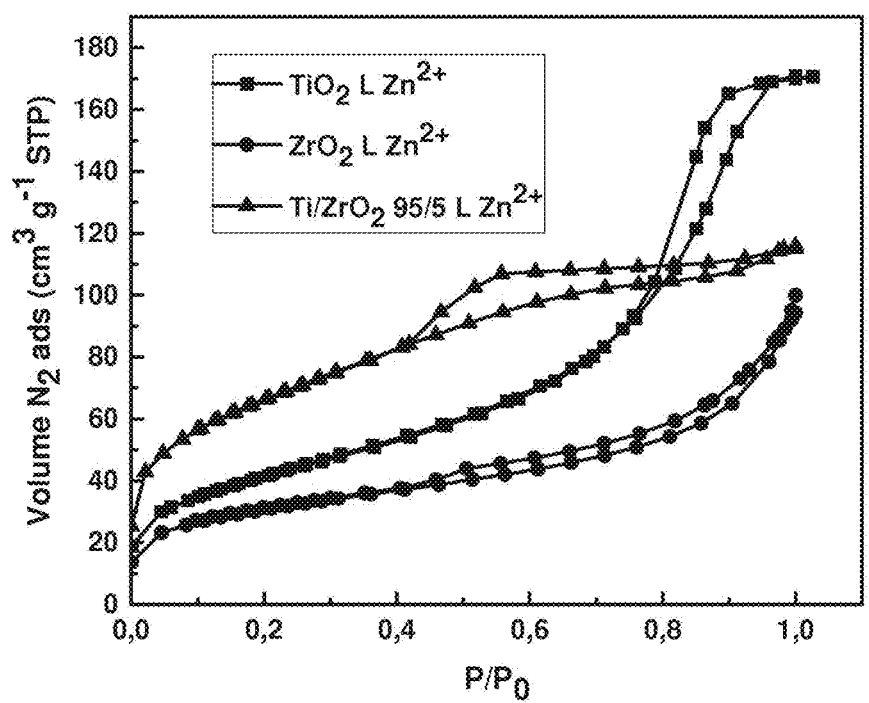

FIG. 18: Nitrogen volumetric absorption isotherms, representing the adsorbed volume as a function of P/P0 (pressure/saturating vapour pressure), of different Ti/$SiO_2$ hybrid oxides from which the surfactant has been extracted using the method according to the invention (Ti/$O_2$-L $Zn^{2+}$, 95/5 Ti/$ZrO_2$ $Zn^{2+}$, $ZrO_2$-L $Zn^{2+}$).

Figure 19:
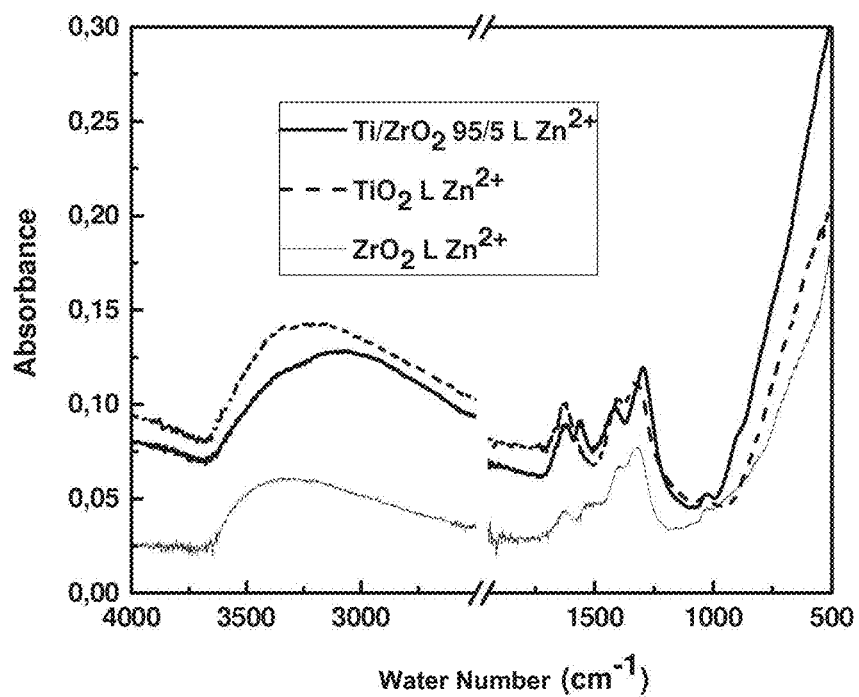

FIG. 19: FTIR spectra obtained with a 95/5 Ti/$ZrO_2$ $Zn^{2+}$ hybrid, $TiO_2$-L $Zn^{2+}$ and $ZrO_2$-L $Zn^{2+}$.

Figure 20:
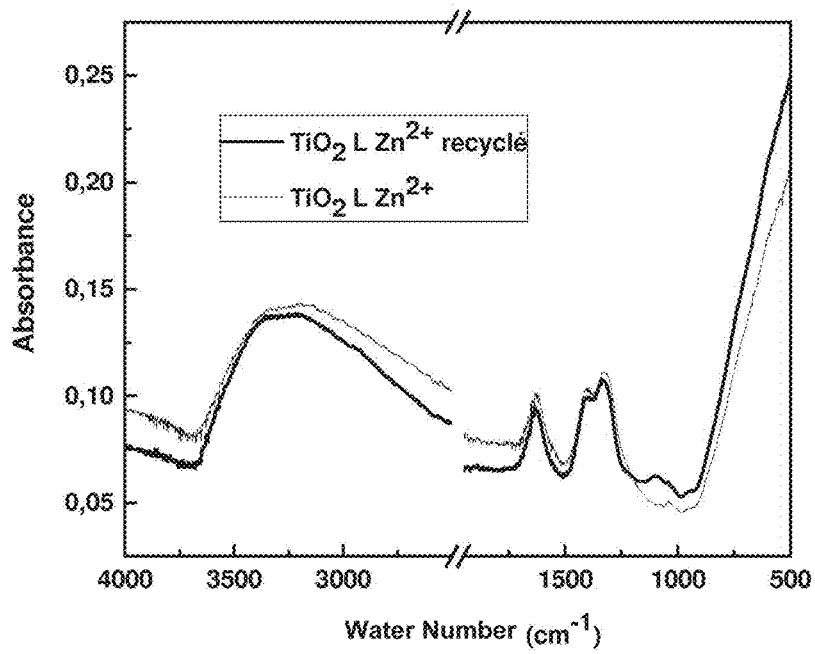

FIG. 20: FTIR spectra obtained with recycled $TiO_2$ L $Zn^{2+}$ and $TiO_2$ L $Zn^{2+}$.

Figure 21A:
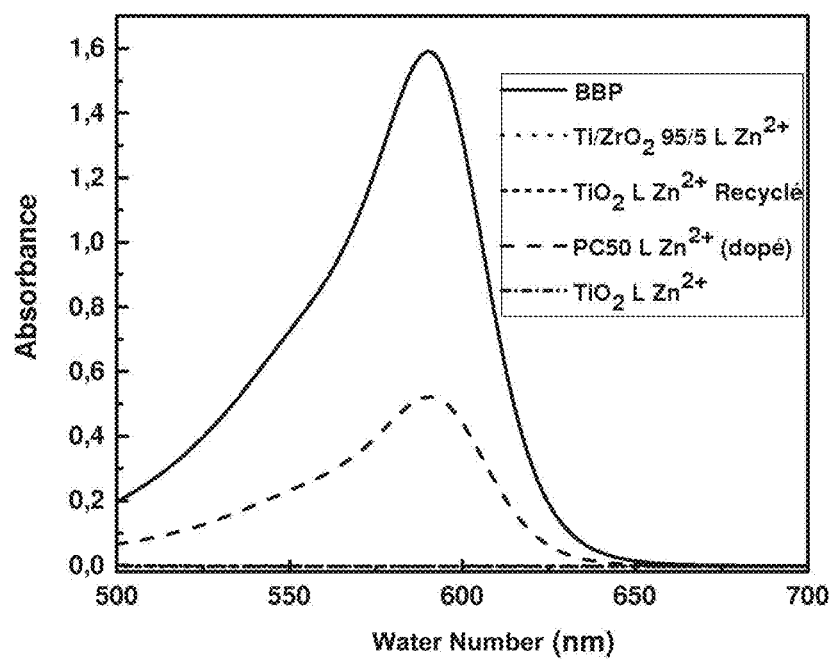

FIG. 21A: UV/visible absorption spectra for bromophenol blue and photocatalytic degradation of bromophenol blue under radiation from a visible spotlight (300 W) with different nanomaterials according to the invention and a commercial titanium dioxide (PC50).

Figure 21B:
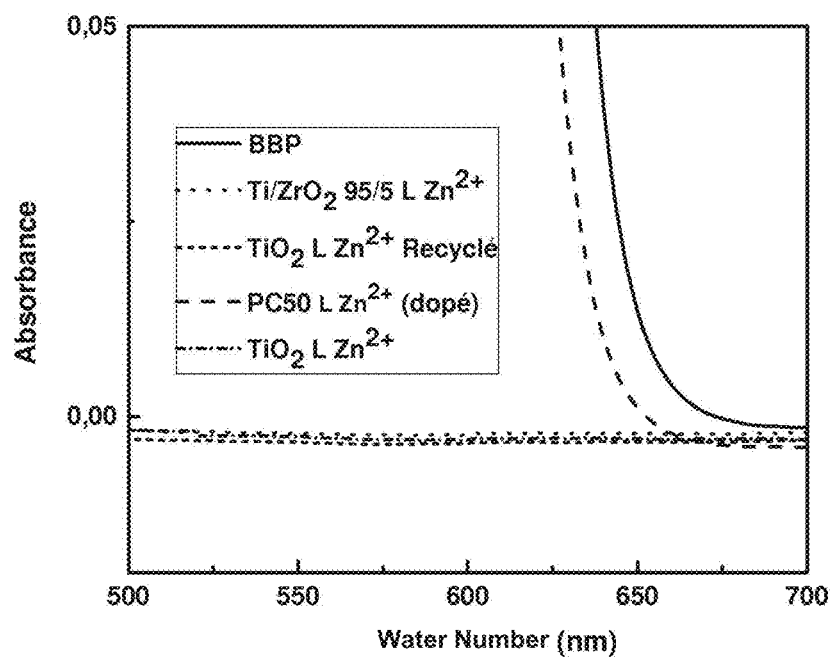

FIG. 21B: UV/visible absorption spectra between 500 nm and 700 mm for bromophenol blue and photocatalytic degradation of bromophenol blue under radiation from a visible spotlight (300 W) with different nanomaterials according to the invention and a commercial titanium dioxide (PC50).

Figure 22:
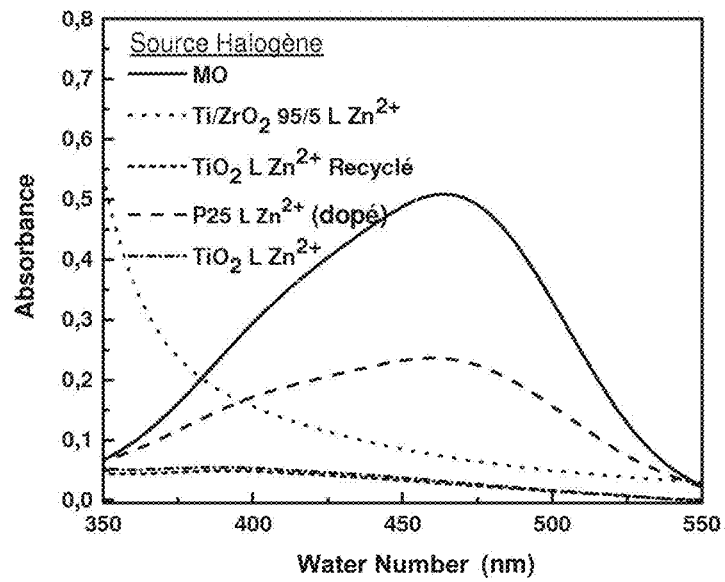

FIG. 22: UV/visible absorption spectra between 500 nm and 700 mm for methyl orange and photocatalytic degradation of methyl orange under radiation from a visible spotlight (300 W) with different nanomaterials according to the invention and a commercial titanium dioxide (P25).

Figure 23:
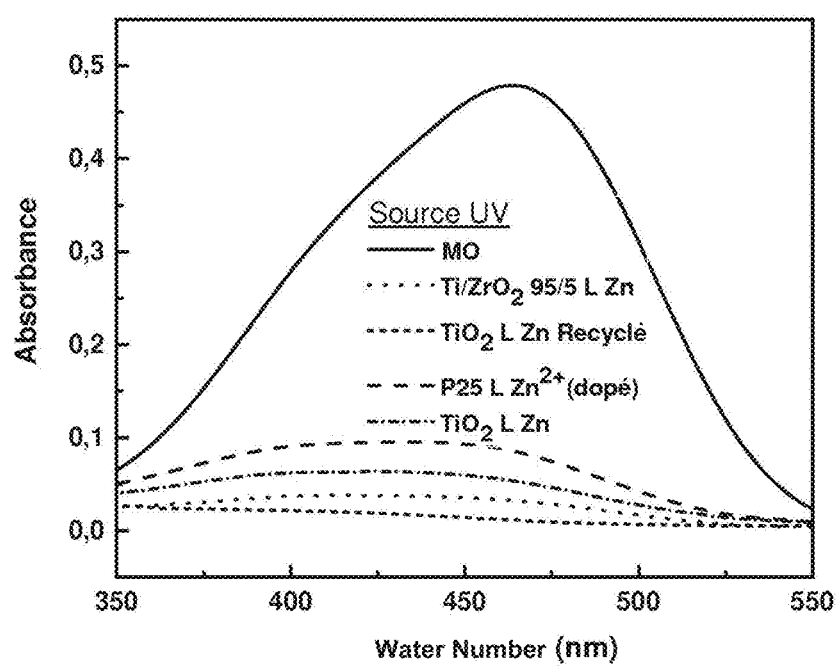

FIG. 23: UV/visible absorption spectra between 500 nm and 700 mm for methyl orange and photocatalytic degradation of methyl orange under radiation from a UV lamp ($\lambda_{max}$-365 nm, 12 W) with different nanomaterials according to the invention and a commercial titanium dioxide (P25).

Figure 24:
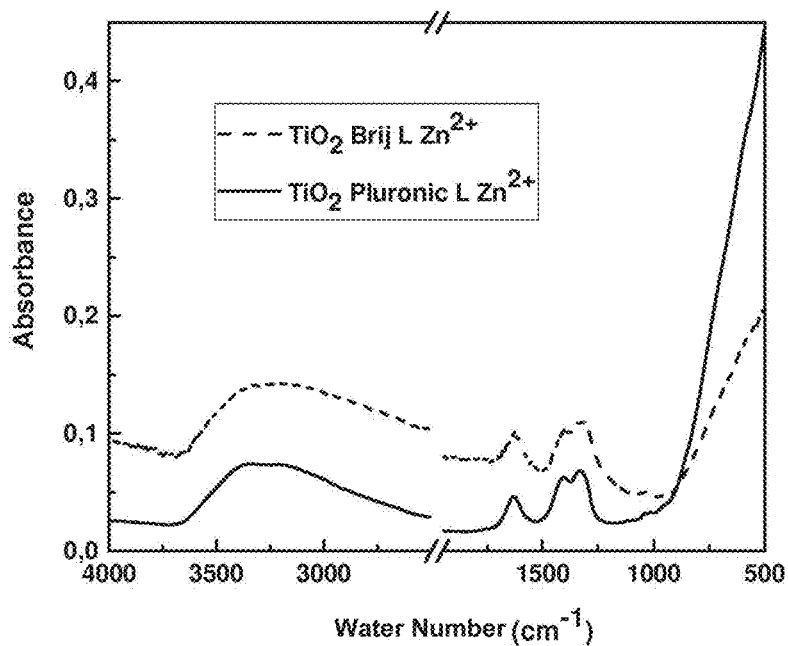

FIG. 24: FTIR spectra obtained for nanomaterials according to the invention based on titanium oxide synthesised with two different surfactants (Pluronic 123 and Brij 97).

Figure 25:
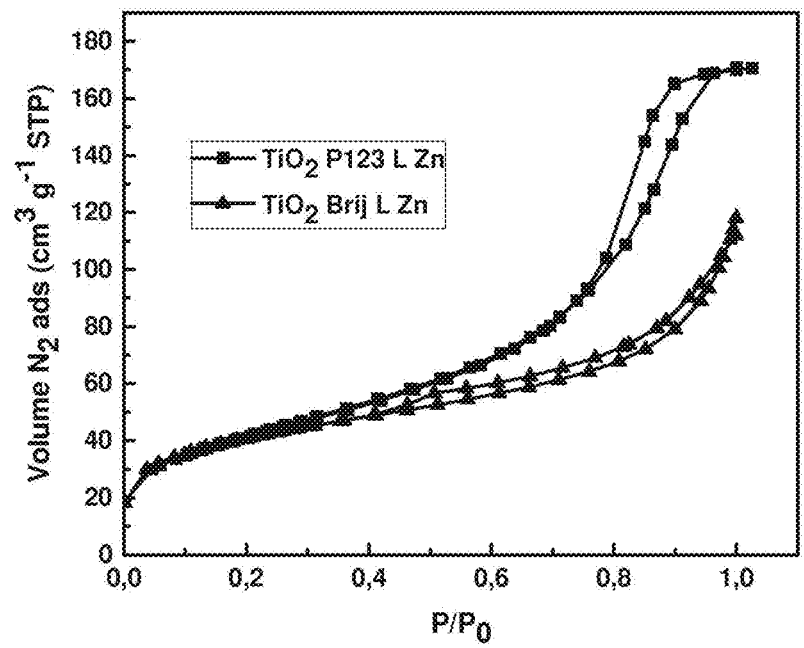

FIG. 25: Absorption isotherms for nanomaterials according to the invention based on titanium oxide synthesised with two different surfactants (Pluronic 123 and Brij 97).

EXAMPLES

I. Preparation and Analysis of Nanomaterials

Spectrometry analyses were made to identify the different significant bands of specific bonds using a Fourier Transform InfraRed (FTIR) Spectrometer (Shimadzu). In the following, this method is called "FTIR spectrometry".

Example 1

Synthesis of Titanium Oxide Comprising a Surfactant

At 50° C., 10 g of 37% v/v hydrochloric acid is mixed with 50 g of water. 1.6 g of Pluronic P123 surfactant is introduced while stirring vigorously. After two hours of stirring, 8.47 mL of titanium tetraisopropoxide (or titanium isopropoxide (TiPOT)) is added. Since this precursor is very reactive in an aqueous medium, precipitation takes place spontaneously. By vigorous stirring, the precipitate dissolves very quickly before the appearance of a new precipitation originating from the polymerisation between the three-dimensional structure derived from hydrolysis and polycondensation of the titanium oxide precursor and the micellar network. The reaction mix is then placed at 50° C. under static conditions for 24 h then at 90° C. for at least 24 h. The solution is then filtered. The solid obtained is rinsed several times with excess water and is dried at ambient temperature.

Example 2

Preparation of Nanomaterials Based on Surfactant-Free Titanium Oxide by Calcination The surfactant of the nanomaterial prepared according to example 1 was extracted using an extraction method based on calcination.

According to this method, 1 g of the nanomaterial containing the surfactant was placed in a ceramic crucible deposited in a tubular furnace at a temperature of 550° C. for 10-15 minutes. The calcination lasted for 16 h. After 5 h of cooling to return to ambient temperature, the surfactant-free nanomaterial was recovered and weighed.

The nanomaterial based on titanium oxide from which the surfactant was extracted according to this method is also called "$TiO_2$ C" in the following.

Example 3

Preparation of Nanomaterials Based on Surfactant-Free Titanium Oxide According to the Invention The surfactant of the nanomaterial prepared according to example 1 was extracted in situ in the surfactant elimination step according to the invention.

An aqueous solution of bivalent metal salt with a concentration of 0.05 mol/L was firstly prepared for this purpose. 200 ml of this solution was then added into a beaker. The pH of this solution was adjusted to the required value (10.5 for $Cu^{2+}$ and $Zn^{2+}$ and 11.5 pour $Ni^{2+}$) by the addition of a 35% v/v solution of ammonia.

Several aqueous solutions of different bivalent metal salts were tested: a solution of copper (II) nitrate trihydrate, nickel (II) nitrate and a solution of zinc (II) nitrate. An entire reaction medium (70.5 mL) was then added to each basic metal salt solution at the end of the synthesis of the nanomaterial containing the surfactant according to example 1, in other words before filtration, rinsing and drying, and the mixture was then stirred vigorously for 10 minutes at ambient temperature and then filtered. The solid obtained was rinsed with ultrapure excess water and dried at ambient temperature.

In order to remove the metal previously grafted to the nanomaterial, and consequently in order to extract all of the surfactant remaining in the nanomaterial, chelated to metal ions, the metallised nanomaterial was immersed into a 60% v/v solution of nitric acid (100 mg of material for 5 mL of nitric acid solution). After 20 minutes of vigorous stirring, the reaction medium was centrifuged (5 minutes at 4500 rpm in a Hettich Universal 320 centrifuge). The nanomaterial obtained was washed with water then dried overnight in a drying oven at 50° C.

Titanium dioxides from which the surfactants were extracted using this method are also referred to below as "$TiO_2$ L" followed by the bivalent metal ion used, for example $TiO_2$ L $Zn^{2+}$ or $TiO_2$ L $Cu^{2+}$. The denomination $TiO_2$ bis L $Zn^{2+}$ is used for a second sample for which the synthesis according to examples 1 and 3 was repeated so as to demonstrate reproducibility of the method according to the invention.

Example 4

Preparation of Nanomaterials Based on Surfactant-Free Hybrid Titanium-Silicon Oxides According to the Invention This protocol is identical to that described for the $TiO_2$ material. 1.6 g of Pluronic P123 is dissolved in a mixture of acid water (10 g of HCl (37% v/v) and 50 g of water) at 50° C. After 2 h of vigorous magnetic stirring, 15/85, 10/90 and 5/95 molar mixtures of TIPOT/TEOS are added. A precipitation takes place spontaneously but is dissolved very quickly. A new precipitation occurs after a few hours. The reaction mix is then placed still at 50° C. under static conditions for 24 h then at 90° C. for 24 h.

Since the solid particles are so very fine, more than 70% of them pass through all filtration systems. Furthermore, these particles cannot be sedimented using a centrifuge. Thus, no solid containing the surfactant can be recovered, and therefore no calcination can be done. This very fine size of nanoparticles can be interpreted as a crystallinity index of the hybrid nanomaterials according to the invention.

One solution to this problem s to agglomerate these particles by metallisation. To achieve this, the washing procedure must be used in situ after cooling the reaction medium from 90° C. to ambient temperature. A solution of a bivalent metal salt chosen from among copper(II) nitrate, nickel (II) nitrate and zinc (II) nitrate at 0.05 M and with a pH of between 10 and 12 is prepared.

For each Ti/SiO hybrid material$_2$ (85/15, 90/10 and 95/5), 150 mL of the metal salt solution at 0.05 M and with pH between 10 and 12 are introduced into a beaker. The reaction medium is incorporated. The pH of the solution then drops suddenly due to the presence of acid in the reaction medium. The addition of a few drops of ammonia raises the pH to the required value (10.5 for $Cu^{2+}$ and $Zn^{2+}$ and 11.5 for $Ni^{2+}$).

After 10 minutes of vigorous mechanical stirring, the materials obtained are filtered under a vacuum using a small pore frit, and then rinsed with water and dried. The presence of foam in the filtrate indicates that the surfactant has been eliminated. Since the particles are metallised and agglomerated to each other, none passes through the filtration system.

The second washing step (demetallisation) is then done. Thus, for 1 g of solid (green with $Cu^{2+}$, white with $Zn^{2+}$ and light green with $Ni^{2+}$), 50 mL of pure nitric acid is used for demetallisation. After 20-30 minutes of vigorous mechanical stirring, the reaction medium is separated equitably into two 50 mL tubes. These tubes are then placed in a centrifuge at 5000 rpm for 5 minutes (Hettich Universal 320 centrifuge). It will be seen that the solid has sedimented and that the solution has become clear. This solution is eliminated and replaced by the same volume of water. The tubes are stirred manually and then placed once again in the centrifuge at the same rotation speed and for the same time as before.

This procedure is repeated until the centrifuged solution remains slightly cloudy, which means that particles of materials remain in suspension. At least 3 centrifuging operations are necessary for optimum rinsing.

The solids obtained are dried.

In the following, titanium-silicon hybrid dioxides according to the invention are also called "x/y % $TiO_2$ L $Zn^{2+}$" followed by or "x/y % $TiO_2$ L" where x/y is the molar ratio Ti/Si, for example 85/15% $TiO_2$ L $Zn^2$.

Example 5

Physiochemical Analyses of Nanomaterials

The nanomaterials prepared according to examples 1 to 4 and from which the surfactant has been extracted using the method according to the invention using a copper (II) nitrate solution (see examples 3 and 4) or by calcination (see example 2), have been analysed in order to detect specific bonds present, and the specific surface area ($A_s$).

The different significant bands of specific bonds were determined by FTIR spectrometry. FIGS. 1-3 present the FTIR spectra obtained ($TiO_2$ NC means the material as obtained after example 1, in other words after elimination of the surfactant). The absence of significant peaks of C—H or C—O bonds close to 2700-2800 cm-1 and in the 800-1400 $cm^{-1}$ region demonstrates that the surfactant has been completely eliminated, both for calcinated titanium dioxide ($TiO_2$—C) and for materials according to the invention. For nanomaterials according to the invention, the presence of two peaks in the 1300-1400 $cm^{-1}$ region are observed that are not present in nanomaterials from which the surfactant has been extracted by calcination. This characteristic becomes increasingly pronounced with increasing proportion of titanium. Without wishing to be bound by any particular theory, the inventors believe that the presence of these bands is due to the presence of nitrate ions, that make the surface of the nanomaterial acid. In this case, an analogy can be made with the study by Enriquez et al. who demonstrated acidification of the surface of a titanium oxide by the use of various quantities of sulphuric acid [9]. This study revealed the presence of an increasingly intense band between 1100 and 1200 $cm^{-1}$ after these treatments, characteristic of $SO_4^{2-}$ bonds depending on the quantity of acid. Furthermore, according to this study, the photocatalytic reactivity of these materials would be directly related to the acidity and the presence of $SO_4^{2-}$ ions [9]. Furthermore, the N—O bonds must vibrate in these wavelength ranges.

The specific surface area ($A_s$) was determined by volumetric adsorption of nitrogen. The volumetric adsorption was measured with a Belsorp II Japan device. Before the measurements, the samples were degassed at 373K at 10 kPa for at least 20 h.

The specific surface area was calculated using the Brunnauer-Emmet-Teller (BET) method.

The volumetric adsorption isotherms of nitrogen, representing the adsorbed volume as a function of P/PO (pressure/saturating vapour pressure), are presented in FIGS. 4A and 4B. The results obtained concerning the specific surface area of nanomaterials are summarised in Table 1.

TABLE 1

| Matrix | specific surface area (m$^2$/g) |
|---|---|
| TiO$_2$ L (Cu$^{2+}$) | 124 |
| TiO$_2$ L (Ni$^{2+}$) | 133 |
| TiO$_2$ L (Zn$^{2+}$) | 153 |
| TiO$_2$ C | 32 |
| 85/15% Ti/SiO$_2$ L | 207 |
| 90/10% Ti/SiO$_2$ L | 195 |
| 95/5% Ti/SiO$_2$ L | 249 |

Finally, the type of adsorption isotherm indicates that we are in the presence of isotherms characteristic of non-porous nanomaterials.

Furthermore, the specific surface area and the number of hydroxyl groups per nm$^2$ of the nanomaterial from which the surfactant was extracted by the method according to the invention are larger than those for the nanomaterial from which the surfactant was extracted by calcination (see FIGS. 15 and 16). The nanomaterial from which the surfactant was extracted by the method according to the invention has a larger loss of water, which clearly illustrates a larger surface area but also a larger number of hydroxyl groups because water bonds to the OH group through a hydrogen bond.

Titanium oxide from which the surfactant was extracted using the method according to the invention (TiO$_2$ L; FIG. 5A) and titanium oxide from which the surfactant was extracted by calcination (TiO$_2$ C; FIG. 5B) were observed with a Transmission Electron Microscope (TEM) on a JEOL JEM-100 CX II UHR instrument.

The TEM images show a clear difference in the morphology that is in perfect agreement with the difference between the specific surface areas. Calcination at 550° C. agglomerates the crystals together to form larger crystalline assemblies reducing the specific surface area. The method according to the invention prevents assembly of crystals.

The number of hydroxyl groups of the different nanomaterials was determined by thermogravimetric analysis (TGA), starting from the mass loss during heating. This analysis was made on a TA Q 50 device. The samples were heated up to 850° C. at a rate of 10° C./min. Two weeks before the TGA was used, the samples had been placed under the same humidity conditions. The graphs are presented in FIGS. 6A and 6B and the results are summarised in Table 2 below.

Concerning the thermogravitometric analysis, it is important to specify that the samples were placed under the same humidity conditions during 4 days before the analysis. This is done by placing each sample in a pillbox and each pillbox is placed in a large receptacle. A pillbox containing water is then added and the large receptacle is closed and put into a drying oven at 25° C.

Thus, looking at the results, it is observed that the washing procedure increases the number of hydroxyl groups on the surface. The sudden slope change that occurs between 200 and 400° C. is another characteristic. It corroborates the results of FTIR spectrometry and demonstrates the presence of nitrate ions. Cabo et al. confirm this hypothesis by studying the decomposition of cobalt and/or nickel nitrate by GTA [10]. Thus, NOx compounds are released in gas form between 200 and 400° C.

Considering that within this temperature range, it is very difficult to separate mass losses due to condensation of silanols and mass losses due to NOx releases, in the table the percentage of nitrogen from the elementary analyses was used as a reference value to more precisely determine the number of silanols.

TABLE 2

| | T (° C.) | 85/15% Ti/SiO$_2$ L | 90/10% Ti/SiO$_2$ L | 95/5% Ti/SiO$_2$ L | TiO$_2$ L 100% Cu | TiO$_2$ 100% C | TiO$_2$ L 100% Ni | TiO$_2$ L 100% Zn |
|---|---|---|---|---|---|---|---|---|
| Number of hydroxyls/nm$^2$ | 400-700 | 1.3 | 1.4 | 1.1 | 1.6 | 0.6 | 2.5 | 1.7 |

Considering the different curves, the mass loss of the washed material is greater. At between 100 and 200° C. a loss of water is observed around the nanomaterials, at between 200 and 400° C. a loss of nitrogenated materials is observed, and starting at 400° C. a loss of water is observed due to condensation of OH groups.

TABLE 3

Elementary analysis for 100% TiO2 nanomaterials

| Matrix | % N | % C |
|---|---|---|
| TiO$_2$ L (Cu$^{2+}$) | 1.1 | absence or trace |
| TiO$_2$ L (Ni$^{2+}$) | 0.6 | absence or trace |
| TiO$_2$ L (Zn$^{2+}$) | 0.8 | absence or trace |
| TiO$_2$ C | nc | absence or trace |
| 85/15 Ti/SiO$_2$ L (Zn$^{2+}$) | 3.2 | absence or trace |
| 90/10 Ti/SiO2 L | 1.8 | absence or trace |

TABLE 3-continued

Elementary analysis for 100% TiO2 nanomaterials

| Matrix | % N | % C |
|---|---|---|
| ($Zn^{2+}$) 95/5 Ti/SiO2 L ($Zn^{2+}$) | 0.9 | absence or trace |

Example 6

Analysis by Electronic Diffraction of Titanium Dioxide Crystals ($TiO_2$ C and $TiO_2$ L $Cu^{2+}$)

Titanium oxide crystals ($TiO_2$ C and L $Cu^{2+}$) were analysed by electronic diffraction to determine their crystalline structure. Several diffraction measurements were made. The results are summarised in Tables 4 and 5 below. Some measurements could be used for the study of all planes.

TABLE 4 electronic diffraction of TiO2 C

| Diffraction | Area (nm$^2$) | Perimeter (nm) | Max. outside dia. | Distance between planes |
|---|---|---|---|---|
| $TiO_2$ C-4 | 4170.29 | 228.92 | 73.456 | 3.223 |
| $TiO_2$ C-4 | 9332.36 | 342.45 | 109.569 | 2.160 |
| $TiO_2$ C-4 | 15222.70 | 437.37 | 139.812 | 1.693 |
| $TiO_2$ C-4 | 20094.79 | 502.51 | 160.549 | 1.474 |
| $TiO_2$ C-4 | 6968.68 | 295.92 | 94.808 | 2.497 |
| $TiO_2$ C-4 | 24808.38 | 558.35 | 178.335 | 1.327 |
| $TiO_2$ C-4 | 37532.60 | 686.77 | 219.205 | 1.080 |
| $TiO_2$ C-5 | 4238.37 | 230.78 | 74.049 | 3.197 |
| $TiO_2$ C-5 | 7323.71 | 303.37 | 97.189 | 2.436 |
| $TiO_2$ C-5 | 9536.34 | 346.18 | 110.759 | 2.137 |
| $TiO_2$ C-5 | 15877.37 | 446.68 | 142.772 | 1.658 |
| $TiO_2$ C-5 | 20543.82 | 508.10 | 162.314 | 1.458 |
| $TiO_2$ C-5 | 25307.03 | 563.93 | 180.130 | 1.314 |
| $TiO_2$ C-6 | 4238.37 | 230.78 | 74.049 | 3.197 |
| $TiO_2$ C-6 | 7234.12 | 301.51 | 96.585 | 2.451 |
| $TiO_2$ C-6 | 9434.08 | 344.31 | 110.185 | 2.148 |
| $TiO_2$ C-6 | 16009.95 | 448.54 | 143.387 | 1.651 |
| $TiO_2$ C-6 | 20393.59 | 506.23 | 161.725 | 1.464 |
| $TiO_2$ C-6 | 25140.26 | 562.07 | 179.510 | 1.319 |
| $TiO_2$ C-19 | 4170.29 | 228.92 | 73.456 | 3.223 |
| $TiO_2$ C-19 | 7234.12 | 301.51 | 96.585 | 2.451 |
| $TiO_2$ C-19 | 15877.37 | 446.68 | 142.772 | 1.658 |
| $TiO_2$ C-19 | 9846.45 | 351.76 | 112.531 | 2.104 |
| $TiO_2$ C-19 | 21303.23 | 517.40 | 165.288 | 1.432 |

TABLE 5 electronic diffraction of $TiO_2$ L

| $TiO_2$ L-3 | 4102.76 | 227.06 | 72.894 | 3.247 |
|---|---|---|---|---|
| $TiO_2$ L-3 | 6794.47 | 292.20 | 93.593 | 2.529 |
| $TiO_2$ L-3 | 8832.06 | 333.15 | 106.632 | 2.220 |
| $TiO_2$ L-3 | 15352.53 | 439.23 | 140.388 | 1.686 |
| $TiO_2$ L-3 | 19650.72 | 496.93 | 158.793 | 1.491 |
| $TiO_2$ L-3 | 23988.33 | 549.04 | 175.376 | 1.350 |
| $TiO_2$ L-3 | 33382.16 | 647.68 | 206.747 | 1.145 |
| $TiO_2$ L-3 | 36723.30 | 679.32 | 216.822 | 1.092 |
| $TiO_2$ L-5 | 6881.29 | 294.06 | 94.166 | 2.514 |
| $TiO_2$ L-5 | 4170.29 | 228.92 | 73.456 | 3.223 |
| $TiO_2$ L-5 | 10161.51 | 357.34 | 114.368 | 2.070 |
| $TiO_2$ L-5 | 15613.85 | 442.96 | 141.613 | 1.672 |
| $TiO_2$ L-5 | 19357.43 | 493.21 | 157.590 | 1.502 |
| $TiO_2$ L-5 | 23664.17 | 545.32 | 174.165 | 1.359 |
| $TiO_2$ L-5 | 35724.07 | 670.02 | 213.881 | 1.107 |
| $TiO_2$ L-9 | 4102.76 | 227.06 | 72.894 | 3.247 |
| $TiO_2$ L-9 | 7145.09 | 299.65 | 95.975 | 2.466 |
| $TiO_2$ L-9 | 16009.95 | 448.54 | 143.387 | 1.651 |
| $TiO_2$ L-9 | 36522.35 | 677.46 | 216.261 | 1.095 |
| $TiO_2$ L-9 | 30383.10 | 617.90 | 197.309 | 1.200 |
| $TiO_2$ L-12 | 3969.34 | 223.34 | 71.694 | 3.302 |
| $TiO_2$ L-12 | 7056.61 | 297.79 | 95.362 | 2.482 |
| $TiO_2$ L-12 | 9130.59 | 338.73 | 108.372 | 2.184 |
| $TiO_2$ L-12 | 10267.64 | 359.20 | 114.932 | 2.060 |
| $TiO_2$ L-12 | 15482.91 | 441.09 | 141.004 | 1.679 |
| $TiO_2$ L-12 | 20393.59 | 506.23 | 161.725 | 1.464 |
| $TiO_2$ L-12 | 23825.97 | 547.18 | 174.770 | 1.354 |
| $TiO_2$ L-24 | 4170.29 | 228.92 | 73.456 | 3.223 |
| $TiO_2$ L-24 | 6881.29 | 294.06 | 94.166 | 2.514 |
| $TiO_2$ L-24 | 8832.06 | 333.15 | 106.632 | 2.220 |
| $TiO_2$ L-24 | 10161.51 | 357.34 | 114.368 | 2.070 |
| $TiO_2$ L-24 | 15352.53 | 439.23 | 140.388 | 1.686 |
| $TiO_2$ L-24 | 19066.35 | 489.48 | 156.381 | 1.514 |
| $TiO_2$ L-24 | 23664.17 | 545.32 | 174.165 | 1.359 |
| $TiO_2$ L-29 | 4307.01 | 232.64 | 74.625 | 3.172 |
| $TiO_2$ L-29 | 7056.61 | 297.79 | 95.362 | 2.482 |
| $TiO_2$ L-29 | 8832.06 | 333.15 | 106.632 | 2.220 |
| $TiO_2$ L-29 | 10267.64 | 359.20 | 114.932 | 2.060 |
| $TiO_2$ L-29 | 15352.53 | 439.23 | 140.388 | 1.686 |
| $TiO_2$ L-29 | 20694.60 | 509.96 | 162.898 | 1.453 |
| $TiO_2$ L-29 | 23342.21 | 541.60 | 173.013 | 1.368 |
| $TiO_2$ L-29 | 34934.61 | 662.57 | 211.487 | 1.119 |

Having seen the results, it is demonstrated that the crystalline structure is not modified regardless of the surfactant elimination technique (calcination or washing).

Comparing the charts [11], the structure of the synthesised titanium oxides is seen to be 100% rutile.

Example 7

Analyses of Nanomaterials by Scanning Microscopy

The nanomaterials in Examples 2 to 4 were analysed by scanning microscopy (SEM-FEG JEOL 7100F).

Scanning microscopy images show different aspects between 100% $TiO_2$ L crystals (FIG. 7A) and 95, 90 and 85% $TiO_2$ hybrids. (FIGS. 7B, 7C and 7D). We can see that the 90 and 85% $TiO_2$ hybrids have a similar solid shape. On the other hand, the 95% $TiO_2$ hybrid resembles neither the 100% $TiO_2$ nor the 90 and 85% $TiO_2$ hybrids.

It is also observed that the specific surface area of 95% $TiO_2$ is much larger than the other hybrids and the 100% $TiO_2$.

Example 8

Photocatalysis of Different Dyes a) Experimental Protocol

Photocatalysis experiments were undertaken with different organic compounds. The protocol is identical in all cases and takes place as follows. A dye concentration of 0.03 mmol·L$^{-1}$ is prepared. For each sample, a concentration by mass of $TiO_2$ materials or Ti/$SiO_2$ hybrids equal to 1 mg/ml was used. After 15 minutes under ultrasounds for maximum particle dispersion, the samples were placed under radiation from a halogen spotlight (visible, 300 W).

The solutions were tested with a UV Visible spectrophotometer.

For a better comparison, standard samples (dyes alone) and samples with commercially available $TiO_2$ are prepared. The latter, called Millenium PC50 or Degussa P25 $TiO_2$ are composed of 99% anatase and 1% rutile, and 80% anatase and 20% rutile respectively.

Unless mentioned otherwise, the 100% $TiO_2$ material used in the photocatalysis experiments is that treated with $Zn^{2+}$ ions in example 3. The hybrid materials used are those in example 4.

b) Results and Discussion

Rhodamine B (RhB)

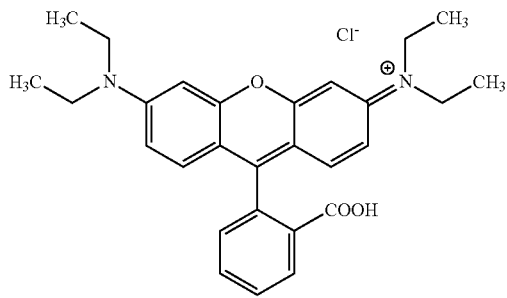 [SMILES: CCN(CC)c1ccc2c(-c3ccccc3C(=O)O)c3ccc(=[N+](CC)CC)cc-3oc2c1 ; [Cl-]]

The absorption spectra (after 5 h of radiation) show that the increase in the percentage of titanium oxide in nanomaterials according to the invention accelerates the rate of degradation (FIG. 8). Even if the 100% titanium oxide material ($TiO_2$ L $Zn^{2+}$) is the most efficient, the hybrid materials are better than the PC50 commercial material. The same effect can be observed with the naked eye. The original colour of the Rhodamine B solution treated with the PC 50 material is almost unchanged after 5 h of radiation, while the other solutions show a significant or even complete discolouration for the $TiO_2$ L $Zn^{2+}$ material.

Methyl Orange (MO)

In this case also, the absorption spectra (after 5 h of radiation) show that an increase in the fraction of titanium oxide accelerates the rate of degradation (FIG. 10). Even if the 100% titanium oxide material is the most efficient, the hybrid materials are better than the PC50 commercial material. The objective is thus achieved. Another important fact is demonstrated. The colour of Methyl orange solutions before radiation (t=0) confirms the hypothesis of surface acidification. This compound also called helianthin is known as being a coloured indicator in acid-basic analyses. The same effects can be observed with the naked eye. The original colour of the methyl orange solution treated with the PC 50 material is almost unchanged after 5 h of radiation, while the other solutions show a significant or even complete discolouration for the $TiO_2$ L $Zn^{2+}$ and 90/10% Ti/$SiO_2$ L materials.

Tests were carried out using UV radiation ($\lambda_{max}$=365 nm, 12 W) for 5 h. These tests also demonstrated the superiority of 100% $TiO_2$ materials according to the invention (FIG. 9).

Bromophenol Blue (BPB)

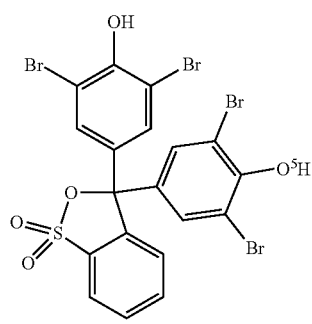

There is no longer any doubt about the hypothesis of the acidity of the washed matrix, the BPB solution changes from blue to green in contact with the material according to the invention. The powder becomes blue, which is synonymous with adsorption of dye molecules on the surface. At the same time, none of these phenomena are observed for the commercial sample.

After radiation with a halogen lamp for 6 h, the absorbance of the different elements at 610 nm was measured. The results are summarised in Table 6 below.

TABLE 6

| Absorbance after 6 h | |
|---|---|
| Sample | Absorbance |
| BPB alone | 1.917 |
| $TiO_2$ L $Cu^{2+}$ | 0.060 |
| $TiO_2$ L $Ni^{2+}$ | 0.030 |
| $TiO_2$ L ($Zn^{2+}$) | 0.012 |
| $TiO_2$ com (PC50) | 0.220 |
| $TiO_2$ C | 1.820 |

Having seen the results in the table, it can be seen that calcination annihilates the photocatalysis, there is no doubt that this is due to the reduction in the specific surface area and the number of hydroxyl groups. The efficiency of the materials according to the invention compared with the commercial material is confirmed.

Thus, two properties of the washed $TiO_2$ material were observed: trapping of organic compounds by adsorption of organic compounds on the surface and then their destruction by photocatalysis.

For the latter, an acceleration of photodegradation was also observed with $Ni^{2+}$ ions and even more with $Zn^{2+}$ ions in comparison with $Cu^{2+}$ ions used in the first washing step. It can be seen that despite the change in the metal salt, discolouration of the BPB solution still occurs on contact with the materials.

Carminic Acid

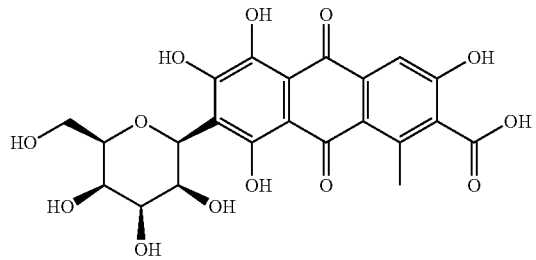 [SMILES: Cc1c(C(=O)O)c(O)cc2c1C(=O)c1c(O)c([C@@H]3O[C@H](CO)[C@H](O)[C@H](O)[C@@H]3O)c(O)c(O)c1C2=O]

Photocatalysis tests with a halogen lamp were made for the following materials: $TiO_2$ L $Zn^{2+}$, 85/15% Ti/$SiO_2$ L, 90/10% Ti/$SiO_2$ L, 95/5% Ti/$SiO_2$ L and PC50. A discolouration of each solution is observed after 1 h 10.

The solutions were analysed with a UV-visible spectrophotometer after 5 h of radiation, in each case the absorbance is "null", no peak is detected at the maximum wavelength of carminic acid (527 nm). The solution containing the 100% $TiO_2$ material according to the invention has a higher absorbance curve than the dye alone due to the diffusion of $TiO_2$ particles that passed through the filter-syringe, but no plateau is observed. The only difference between all the samples is in the colour of the powder after filtration: very coloured for the commercial material and becoming less coloured as the quantity of TiO$_2$ is increased for samples according to the invention until being absent from the matrix containing 100% of titanium oxide. Therefore it would appear that photocatalysis is complete for the latter material.

A discolouration of each solution is observed after 1 h 10.

The solutions were analysed with a UV-visible spectrophotometer after 5 h of radiation (FIG. 11), in each case the absorbance is "null", no peak is detected at the maximum wavelength of carminic acid (527 nm). The solution containing the 100% TiO$_2$ material has a higher absorbance curve than the dye alone due to the diffusion of TiO$_2$ particles that passed through the filter-syringe, but no plateau is observed. The only difference between all the samples is in the colour of the powder after filtration: very coloured for the commercial material and becoming less coloured as the quantity of TiO$_2$ is increased for washed samples until being absent from the matrix containing 100% of titanium oxide.

Therefore it would appear that photocatalysis is complete for the latter material.

Fuchsin Acid

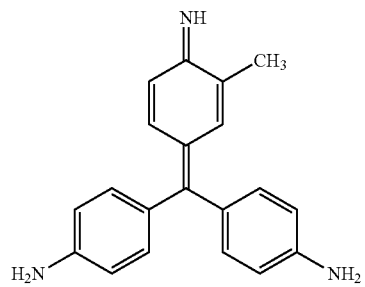 [SMILES: CC1=CC(=C(c2ccc(N)cc2)c2ccc(N)cc2)C=CC1=N]

A discolouration was observed for the solutions containing materials according to the invention. It is much more visible for the sample containing 90% of TiO$_2$. At t=6 h, all the solutions are completely discoloured, the only solution that had not changed is the solution containing the PC50 material.

The solutions are analysed with the UV-visible spectrophotometer after 6 h of radiation (halogen lamp), and the spectra obtained confirm the trend (FIG. 12). The only material that did not degrade the fuchsin acid molecules was the commercial material. Even though the 90% TiO$_2$ degraded more quickly, it would appear that the matrix containing 100% titanium oxide is the most efficient in the long run; since the recovered powder was not coloured compared with the others.

Direct Red 75:

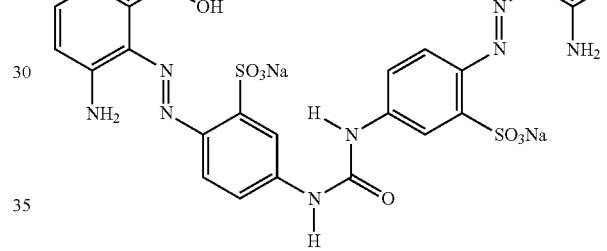

All solutions were discoloured after 3 h. However, all materials according to the invention are better than PC50.

The solutions are analysed with the UV-visible spectrophotometer after 3 h of radiation (halogen lamp). The observed spectra confirm the trend (FIG. 13).

Calcomine Orange

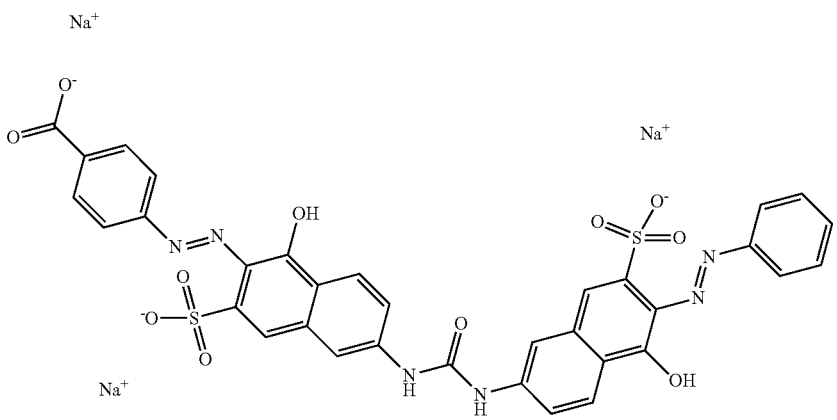

A discolouration was observed for the solutions containing materials according to the invention. However, the best results are obtained with $TiO_2$ L $Zn^{2+}$ in example 3.

The solutions are analysed with the UV-visible spectrophotometer after 3 h30 of radiation (halogen lamp), and the spectra obtained confirm the trend (FIG. 14).

During exposure to radiation (halogen lamp), the solution of calcomine orange with $TiO_2$ L $Zn^{2+}$ is the first to become clear but the powder recovered after filtration and rinsing only has very slight colouring. All the powders are coloured for the other materials, which means that dye molecules are adsorbed on the surface. The 85/15% Ti/Si hybrid material demonstrates the higher adsorption capacity of all the hybrid materials. Strong sedimentation is observed in the pillbox making the solution clear. It would also appear that the commercial material does not degrade the molecules, but simply adsorbs them.

In conclusion, the combined action of the synthesis method and the washing process produces a highly reactive type of crystalline rutile titanium oxide that can either destroy the polluting compounds, or adsorb them (possibly with rerelease).

Example 9

Other Organic Compounds

Glyphosate:

A few laboratory tests were carried out using $TiO_2$ L $Zn^{2+}$ from example 3 to trap a glyphosate solution in water with a concentration of 0.1 mg/mL (herbicide known throughout the world as Round-Up®) without any radiation. These compounds are apparently adsorbed on the surface. In an aqueous solution, the $TiO_2$ remain in suspension even during centrifuging. However, sedimentation of particles is observed in contact with organic compounds, showing that the particles are agglomerated or their weight is increased. The hypothesis is confirmed by the study of the FTIR spectrum (FIG. 15). The two curves are very similar, except that the reduction in the absorbance of the band characteristic of N—O bonds demonstrating adsorption of a compound on the surface and the appearance of fairly sharp peaks between 1100 and 1000 $cm^{-1}$ and in the 1600 $cm^{-1}$ region demonstrating bonds of a carboxylic acid group and slightly weaker at about 2500 $cm^{-1}$ demonstrating bonds of a phosphonic acid.

Ampicillin:

In the same way, molecules of ampicillin (antibiotic in the penicillins family) at a concentration by mass in water equal to 0.1 mg/ml were destroyed by photocatalysis by the $TiO_2$ L $Zn^{2+}$ from example 3 (see HPLC results: FIGS. 16A and 16B). The ampicillin peak on the signal from the ELSD detector (light diffusion) emerges at about 2.9 min despite the radiation (the injection peak emerging at 2.1 min). However, after 5 h radiation in the presence of $TiO_2$ L $Zn^{2+}$, this characteristic peak has disappeared meaning that the ampicillin molecules have completely disappeared.

Hydrocarbons:

A test was carried out using $TiO_2$ L $Ni^{2+}$ from example 3 to degrade a solution composed of 50% (v/v) of hydrocarbons (octane/1,3,5 trimethylbenzene) and 50% (v/v) of salty sea water.

In the same way as for glyphosate, it was observed that even if $TiO_2$ L $Ni^{2+}$ particles remain in suspension in the aqueous phase (milky appearance), a large quantity of particles settles at the interface between the aqueous phase and the organic phase after contact between the nanomaterial and the solution of hydrocarbons and sea water. Therefore hydrocarbon molecules are adsorbed at the surface of the nanomaterial. This was confirmed after filtration of the sample: 2.5 ml of hydrocarbons were thus trapped per 10 mg of nanomaterial.

Glucose:

For this experiment, the concentration of glucose is 0.5 mg/mL and the material concentration is identical 1 mg/mL (solvent: water).

A range of glucose concentrations was prepared. These concentrations are determined by UV Visible spectrometry after the addition of 1 mL of Fehling's solution. When hot, in the presence of a reducing substance (in this case glucose), Fehling's solution gives a red precipitate of copper oxide $Cu_2O$ (copper I). Thus, the absorbance band of $Zn^{2+}$ at about 660 nm reduces as the concentration of glucose increases.

Thus, the $TiO_2$ L $Zn^{2+}$ material reduces the concentration of glucose in solution by half Perfluorooctanoic Acid:

Perfluorooctanoic acid (PFOA) is a synthetic fluorinated surfactant (not found in nature). It is very stable and is consequently extremely persistent (quasi-indefinitely) in the environment. Due to its cumulation, its toxicity and its persistence, it is classified in Europe in the Reach regulation as a substance of very high concern.

The experimental protocol is as follows: concentration of organic compound 0.1 mg/mL, concentration of $TiO_2$ L $Zn^{2+}$ 1 mg/mL (water solvent), 15 minutes in an ultrasound bath to disperse particles in solution, 3 hours of halogen radiation. The sample is then filtered to separate the material from the solution. The retained solid is rinsed with water then dried at ambient temperature and analysed by Fourier Transform InfraRed (FTIR) spectrometry.

The FTIR spectrum of the $TiO_2$ L $Zn^{2+}$ recovered at the end of the experiment is very different from the FTIR spectrum for the $TiO_2$ L $Zn^{2+}$ material (FIG. 17). The band corresponding to N—O bonds has disappeared from the spectrum of the recovered material, confirming adsorption of organic molecules on the surface. Several peaks have also appeared between 1000 and 1500 $cm^{-1}$, at about 2700 $cm^{-1}$ and the characteristic peak of water (1600 $cm^{-1}$) seems wider and has a plateau. All these peaks correspond to vibrations of C—F, C—C bonds and carboxylic acid groups (C—O, C=O, O—H).

It is thus demonstrated that PFOA molecules are adsorbed.

In conclusion, and as demonstrated particularly in examples 8 and 9, the combined action of the synthesis method and the washing process produces a highly reactive type of crystalline rutile titanium oxide that can either destroy the polluting compounds, or adsorb them (possibly with rerelease).

This characteristic is discussed fairly broadly in current literature. It would seem that adsorption is facilitated by the use of functionalised commercial titanium oxides (carbon, polymer) [12,13]. Adsorption of non-functionalised $TiO_2$ materials would depend on the pH.

In this respect, the best adsorption results would be obtained by moderately acidifying the adsorbent solution (pH=3) [14].

Nevertheless, titanium oxide synthesised at the present time is still competitive in terms of its synthesis and environmental cost, and appears to have better adsorption properties.

Example 10

Synthesis of a Ti/ZrO$_2$ Hybrid Material According to the Invention

A Ti/ZrO$_2$ hybrid nanomaterial was synthesised using the procedure according to example 4, replacing the silicon precursor (TEOS) by zirconium propoxide in 70% of propanol (the propanol is evaporated before the precursor is added into the reaction medium) and using a solution of zinc nitrate for the first washing step. This material is composed of 95% of TiO$_2$ moles and 5% of ZrO$_2$ moles and is called 95/5 Ti/ZrO$_2$ (Zn) in the following.

Example 11

Physiochemical Analysis of 95/5 Ti/ZrO$_2$ (Zn)

The specific surface area ($A_s$) was determined by volumetric adsorption of nitrogen as was described in example 5 for the following materials: TiO$_2$ L Zn$^{2+}$, ZrO$_2$ L Zn$^{2+}$, 95/5 Ti/ZrO$_2$ (Zn). The ZrO$_2$ L Zn$^{2+}$ was prepared in a manner similar to the TiO$_2$ L Zn$^{2+}$ with zirconium propoxide in 70% of propanol as zirconium precursor (the propanol is evaporated before the precursor is added into the reaction medium).

As shown by the adsorption isotherms, the specific surface area of ZrO$_2$ is smaller than that of TiO$_2$ but 5% of ZrO$_2$ added to 95% of TiO$_2$ gives a material (95/5 Ti/ZrO$_2$ (Zn)) with a much larger specific surface area than the 100% TiO$_2$ L Zn$^{2+}$ material (FIG. 18).

The same phenomenon on the surface is observed on the FTIR spectra (FIG. 19) between 1000 and 1800 cm$^{-1}$. The TiO$_2$ L Zn$^{2+}$ and 95/5 Ti/ZrO$_2$ (Zn) materials have the same peaks at the same intensities. While even if the material has the same peaks, their intensity is much smaller.

As a reminder, the bands between 1300 and 1400 cm$^{-1}$ are characteristic of the N—O bond of adsorbed NO$_3^{-1}$ ions responsible for acidification of the surface. As mentioned above, this acidification would improve photocatalytic properties of materials.

The peak at about 1600 cm$^{-1}$ is characteristic of vibrations of water molecules.

Example 12

Recycling of TiO$_2$ L (Zn$^{2+}$)

A good photocatalyst must be effective in eliminating organic compounds, as was demonstrated above. But it also needs to be recyclable and reusable several times without reducing its efficiency.

To demonstrate the capability of TiO$_2$ L Zn$^{2+}$ to be recycled and reused, the powder recovered at the end of photocatalysis (Example 8: bromophenol blue) is rinsed by excess absolute ethanol. After centrifuging, the float is eliminated. The powder is then placed in a 10% solution of nitric acid to destroy molecules of residual dye but especially to restore the surface acidity that would appear to be reduced at the end of the previous photocatalysis. Centrifuging is very difficult at this time. A part of the recycled material remains in suspension. The float is eliminated and the other part of the material settles and is dried at ambient temperature.

FIG. 20 shows the spectrum of the recycled material compared with the spectrum of the base material. The spectra are similar. Recycling does not seem to destroy the material.

Example 13

Photocatalysis with Recycled TiO$_2$ L Zn$^{2+}$ and Ti/ZrO$_2$ L Zn$^{2+}$ a) Experimental Protocol The recycled TiO$_2$ L Zn$^{2+}$ and 95/5 Ti/ZrO$_2$ L Zn$^{2+}$ materials were tested in photocatalysis to degrade the dyes. The TiO$_2$ L Zn$^{2+}$ and commercial titanium oxide (PC50 and P25) materials were also used with the washing procedure, to compare their efficiency. It is important to note that commercial titanium oxides used up to now were pure. In recent years, very small quantities of metal ions are added within these materials to increase their photocatalytic reactivity. Therefore the washing procedure was used on these materials since metal elements in particular (in ionic form) remain adsorbed residually.

The protocol is identical to previous experiments on dyes (concentration of material 1 mg/mL, concentration of dye 3×10$^{-5}$ mol/L). Two types of dyes were used (Bromophenol and methyl orange) in two types of radiation (visible light and UV lamp).

c) Results and Discussion

Bromophenol Blue

All solutions changed colour in contact with the materials. Acidification of the surface is still applicable. In this case the source of radiation is the halogen spotlight (visible light equivalent to sunlight). Concentrations are monitored by visible spectrophotometry and the results after 3 h of radiation are given in FIGS. 21A and 21B.

The commercial oxide only partially destroys dye molecules, even when doped. This means that doping did not significantly improve its photocatalytic reactivity. All other materials have fairly good efficiency. No more peaks are observed, the spectra are flat. This means that there are no longer any more molecules in solution.

Thus, recycling did not change the photocatalytic reactivity of the material. The recycled 95/5 Ti/ZrO$_2$ hybrid and TiO$_2$ L Zn$^{2+}$ appear to be efficient.

Methyl Orange

The protocol is identical to that used for the test with bromophenol blue. A UV source is also used. The commercial material in this case is P25 that was also doped. Concentrations are monitored using spectrophotometry and the results after 5 h of radiation are given in FIGS. 22 (halogen lamp) and 23 (UV light).

Regardless of the source of radiation used, the doped commercial material has the lowest photocatalytic reactivity. Reactivity seems slightly better under UV radiation than under halogen radiation. Therefore doping could not reverse the trend even in UV, the most efficient material is still synthesised and washed 100% titanium oxide materials.

The reactivity of the recycled $TiO_2$ L Zn material is not as good as that of the $TiO_2$ material. It is found that under UV radiation, the recycled $TiO_2$ L Zn material is even better, undoubtedly related to the recycling procedure (use of nitric acid).

Finally, the $Ti/ZrO_2$ material is also just as efficient.

The shape of its curve derived from the experiment with the halogen spotlight is due to the presence of particles in solution diffusing in the tank at the time of the measurement. But the dye molecules were entirely eliminated.

Example 14

Preparation of $TiO_2$ with an Alkenyl Ether of Polyoxyethylene Glycol

A $TiO_2$ L $Zn^{2+}$ material was synthesised using the procedure given in examples 1 and 3, replacing the surfactant by Brij 97 ($C_{18}H_{35}(EO)_{10}OH$, marketed for example by BASF). This material is called $TiO_2$ Brij L $Zn^{2+}$ in the following.

Example 15

Physiochemical Analysis of $TiO_2$ Brij L $Zn^{2+}$

The FTIR spectra of $TiO_2$ Brij L $Zn2^+$ and $TiO_2$ L $Zn^{2+}$ in example 3 ($TiO_2$ Pluronic L $Zn^{2+}$) were compared (FIG. 24).

Residual nitrate ions are present for the two materials. The spectra are similar. This means that replacement of the surfactant does not seem to have modified the material.

The surfactant has been well eliminated by washing, no peak can be seen characteristic of the presence of surfactant molecules.

The two materials were then analysed by $N_2$ volumetric adsorption (FIG. 25). The adsorption/desorption isotherms are fairly different but the extracted data are fairly similar, particular the specific surface area: 144 $m^2/g$ for $TiO_2$ Brij L $Zn^{2+}$ and 153 $m^2/g$ $TiO_2$ Pluronic L Zn2+.

REFERENCES

[1] Hanaor, D. A. H.; Sorell, C. C. Review of the anatase to rutile phase transformation. *J. Mater Sci,* 2011, 46, 855-874.

[2] Ibhadon, O.; Fitzpatrick, P. Heterogeneous Photocatalysis: Recent Advances and Applications. *Catalysts,* 2013, 3, 189-218.

[3] Luttrell, T.; Halpegamage, S.; Tao, J.; Kramer, A.; Sutter, E.; Batzill, M. Why is anatase a better photocatalyst than rutile?—model studies on epitaxial $TiO_2$ films. *Sci Rep.,* 2014, 9, 4043

[4] Pillai, S. C.; Periyat, P.; George, R.; McCormack, D. E.; Seery, M. K.; Hayden, H.; Colreavy, J.; Corr, D.; Hinder, S; Synthesis of High-Temperature Stable Anatase $TiO_2$ Photocatalyst. *J. Phys. Chem. C,* 111, 1605 (2007)

[5] Liu, Z. F.; Tabora, J.; Davis, R. J. Relationships between Microstructure and Surface Acidity of Ti—Si Mixed Oxide Catalysts. *J. Catal.,* 1994, 149, 117-126.

[6] Mahyar, A.; Behnajady, M. A.; Modirshahla, N. Characterization and photocatalytic activity of SiO2-TiO2 mixed oxide nanoparticles prepared by sol-gel method. *Indian Journal of Chemistry,* 2010, 49A, 1593-1600.

[7] Miao, G.; Chen, L.; Qi, Z. Facile Synthesis and Active Photocatalysis of Mesoporous and Microporous $TiO_2$ Nanoparticles. *Eur. J Inorg. Chem.,* 2012, 5864-5871.

[8] Messina, P. V.; Schulz, P. C. Adsorption of reactive dyes on titania-silica mesoporous materials. *Journal of Colloid and Interface Science,* 2006, 299, 305-320.

[9] Enriquez, J. M. H.; Lajas, L. A. C.; Alamilla, R. G.; San Martin, E. A.; Alamilla, P. G.; Handy, E. B.; Galindo, G. C. G.; Serrano, L. A. G. Synthesis of solid acid catalysts based on $TiO_2$—$SO_4^{2-}$ and $Pt/TiO_2$—$SO_4^{2-}$ applied in n-hexane isomerisation. Open Journal of Metal, 2013, 3, 34-44.

[10] Cabo, M.; Pellicer, E.; Rossinyol, E.; Estrader, M.; Lôpez-Ortega, A.; c Nogués, J.; Castell, O.; Surinach, S.; Baro, M. D. Synthesis of compositionally graded nanocast $NiO/NiCo_2O_4/Co_3O_4$ mesoporous composites with tunable magnetic properties. *Journal of Materials Chemistry,* 2010, 20, 7021-7028.

[11] *Natl, Bur. Stand.* (*U.S.*) *Monogr* 25. 1969, 7, 83.

[14] Janus, M.; Kusiak-Nejman, E.; Morawski, A. W. Determination of the photocatalytic activity of TiO2 with high adsorption capacity. *Reac Kinet Meck Cat,* 2011, 103, 279-288.

[15] Wang, N.; Li, J.; Lv, W.; Feng, J.; Yan, W. Synthesis of polyaniline/TiO2 composite with excellent adsorption performance on acid red G. *RSC Adv.,* 2015, 5, 21132-21141.

[16] Behnajady, M. A.; Yavaru, S.; Modirshahla, N. Investigation on adsorption capacity of TiO2-P25 nanoparticles in the removal of a mono-azo dye from aqueous solution: a comprehensive isotherm analysis. *Chem. Ind. Chem. Eng. Q.,* 2014, 20, 97-107.

The invention claimed is:

1. Method of preparing a nanomaterial containing 80 to 100 mole % of $TiO_2$ and 0 to 20 mole % of another metal or semi-metal oxide chosen particularly from among $SiO_2$, $ZrO_2$, $WO_3$, $ZnO$, $Al_2O_3$ and $Fe_2O_3$, with a specific surface area of between 100 and 300 $m^2 \cdot g^{-1}$ and from 1 to 3 hydroxyl groups per $nm^2$, said method including the following steps:

a) Synthesis of a material composed of 80 to 100 mole % of $TiO_2$ and 0 to 20 mole % of another oxide starting from a titanium oxide precursor or a mix of a titanium oxide precursor and a precursor of another oxide, the synthesis being made in an aqueous medium with a pH between 0 and 1 and at a temperature varying from 40 to 95° C. in the presence of a non-ionic surfactant chosen from among ankenyl ethers of polyoxyethylene glycol and poloxamers;

b) Elimination of the surfactant from the material synthesised in the previous step by the following steps:

b1) Preparation of a metallised material by washing the material containing the surfactant with an aqueous solution of a bivalent metal salt and an aqueous solution of ammonia, b2) Recovery of firstly the metallised material and secondly a washing solution, b3) Treatment of the metallised material with an inorganic acid to remove the metal from the material, c) Recovery of firstly a nanomaterial with no surfactant and secondly a residual solution.

2. Method according to claim 1, in which the material synthesis step a) comprises the following steps:
   a1) preparing an acid aqueous solution of the non-ionic surfactant,
   a2) adding the titanium oxide precursor or the mixture of the titanium oxide precursor and the precursor of the other oxide to the acid aqueous solution of the non-ionic surfactant, and a precipitate then forms,
   a3) vigorously stiring the reaction medium so as to dissolve the precipitate formed in step a2) then polymerising the titanium oxide precursor or the mixture of the titanium oxide precursor and the precursor of the other oxide,
   a4) placing the reaction mixture from step a3) under static conditions for at least 24 h, and then
   a5) recovering firstly a material composed of 80 to 100 mole % TiO2 and 0 to 20 mole % of the other oxide, and secondly a residual solution.

3. Method according to claim 1, in which step b) is performed in situ.

4. Method according to claim 1, in which the bivalent metal salt is chosen from salts of copper (II), cobalt (II), nickel (II) and zinc (II).

5. Method according to claim 1, in which the other oxide is chosen from $SiO_2$ and $ZrO_2$.

6. Method according to claim 1, in which the nanomaterial is composed of 100 mole % of $TiO_2$.

7. Nanomaterial obtainable by the method according to claim 1 composed of 80 to 100 mole % of $TiO_2$ and 0 to 20 mole % of another metal or semi-metal oxide chosen from among $SiO_2$, $ZrO_2$, $WO_3$, $ZnO$ and $Al_2O_3$ and $Fe_2O_3$, particularly among $SiO_2$ and $ZrO_2$, with
   divalent metal cations adsorbed on the surface of the nanomaterial,
   surface acidity, coming from step b) of the method,
   nitrate ions,
   a specific surface area between 100 and 300 $m^2 \cdot g^{-1}$,
   from 1 to 3 hydroxyl groups per $nm^2$,
   a pH equal to between 3 and 5
   and having a rutile nanocrystalline structure when it composed of 100 mole % of $TiO_2$.

8. Nanomaterial according to claim 7, characterised in that is composed of 80 to 95 mole % of $TiO_2$ and 5 to 20 mole % of another metal or semi-metal oxide chosen from $SiO_2$, $ZrO_2$, $WO_3$, $ZnO$ and $Al_2O_3$ and $Fe_2O_3$, and particularly from $SiO_2$ and $ZrO_2$.

9. A method for the photocatalytic degradation of compounds, comprising bringing the nanomaterial according to claim 7 into contact with a solution containing the compounds and exposing the solution and nanomaterial to at least one of UV radiation and visible radiation thereby to degrade compounds adsorbed onto the surface of the nanomaterial.

10. The method according to claim 9, characterised in that the compounds are chosen from dyes, pharmaceutical active constituents, herbicides, pesticides, fungicides, hormones, saccharides, such as glucose, and/or hydrocarbons.

11. Nanomaterial according to claim 7, characterised in that the metal cations are chosen from $Zn^{2+}$, $Ni^{2+}$ or $Cu^{2+}$.

* * * * *